United States Patent
Kwak et al.

(10) Patent No.: US 9,904,284 B2
(45) Date of Patent: *Feb. 27, 2018

(54) MOVING ROBOT AND METHOD FOR CONTROLLING THE SAME

(71) Applicant: SAMSUNG ELECTRONICS CO., LTD., Suwon-si, Gyeonggi-do (KR)

(72) Inventors: No San Kwak, Suwon-si (KR); Hong Jun Kim, Yongin-si (KR); Ji Min Kim, Seoul (KR); Kyung Shik Roh, Seongnam-si (KR); Soon Yong Park, Bucheon-si (KR); Suk June Yoon, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/086,907

(22) Filed: Mar. 31, 2016

(65) Prior Publication Data

US 2016/0363930 A1 Dec. 15, 2016

(30) Foreign Application Priority Data

Jun. 9, 2015 (KR) .................. 10-2015-0081117

(51) Int. Cl.
 *G05D 1/00* (2006.01)
 *G05D 1/02* (2006.01)

(52) U.S. Cl.
 CPC ......... *G05D 1/0016* (2013.01); *G05D 1/0033* (2013.01); *G05D 1/0231* (2013.01);
(Continued)

(58) Field of Classification Search
 CPC .. G05D 1/0016; G05D 1/0231; G05D 1/0238; G05D 2201/0203; Y10S 901/01;
(Continued)

(56) References Cited

U.S. PATENT DOCUMENTS 4,627,511 A * 12/1986 Yajima ................ G05D 1/0242
 180/167
9,675,229 B2 * 6/2017 Kwak ................ A47L 11/4011
(Continued)

FOREIGN PATENT DOCUMENTS

KR 10-2004-0023421 3/2004
KR 10-0621415 8/2006
(Continued)

OTHER PUBLICATIONS

International Search Report dated Jul. 29, 2016 in corresponding International Patent Application No. PCT/KR2016/003517.

*Primary Examiner* — Shardul Patel
(74) *Attorney, Agent, or Firm* — Staas & Halsey LLP

(57) ABSTRACT

A robot that moves to a position indicated by a remote device, and a method for controlling the moving robot. The moving robot according to an embodiment includes a traveling unit that moves a main body, a light reception unit that receives light, and a control unit that determines a traveling direction of the moving robot by filtering the light received from the light reception unit in accordance with a probability-based filtering method, and controls the traveling unit so that the main body travels in the traveling direction.

27 Claims, 33 Drawing Sheets

(52) U.S. Cl.
CPC ... *G05D 1/0238* (2013.01); *G05D 2201/0203* (2013.01); *Y10S 901/01* (2013.01)

(58) Field of Classification Search
CPC .. A47L 9/2852; A47L 9/2894; A47L 2201/06; A47L 2201/04
USPC ....... 701/2, 23; 700/245, 253, 258; 180/167; 250/216; 901/1
See application file for complete search history.

(56) References Cited

U.S. PATENT DOCUMENTS

| | | | |
|---|---|---|---|
| 2006/0025887 A1* | 2/2006 | Park | G05D 1/0242 |
| | | | 700/245 |
| 2010/0292839 A1* | 11/2010 | Hong | G05D 1/0234 |
| | | | 700/253 |
| 2011/0125323 A1* | 5/2011 | Gutmann | G05D 1/0234 |
| | | | 700/258 |
| 2013/0331990 A1* | 12/2013 | Jeong | G01S 17/936 |
| | | | 700/259 |
| 2014/0156071 A1* | 6/2014 | Hong | G05D 1/0234 |
| | | | 700/253 |
| 2014/0180525 A1* | 6/2014 | Tsuboi | G05D 1/0033 |
| | | | 701/23 |
| 2014/0268179 A1* | 9/2014 | DiBernado | G01S 5/163 |
| | | | 356/614 |

FOREIGN PATENT DOCUMENTS

| | | |
|---|---|---|
| KR | 10-0809352 | 2/2008 |
| KR | 10-2014-0066850 | 6/2014 |
| KR | 10-2016-0004166 | 1/2016 |

\* cited by examiner

< LIGHT SPOT >

(a)

(b)

(a)

(b)

(a)

(b)

MOVING ROBOT AND METHOD FOR CONTROLLING THE SAME

CROSS-REFERENCE TO RELATED APPLICATIONS

This application claims benefit of foreign priority to Korean Patent Application No. 10-2015-0081117, filed on Jun. 9, 2015 in the Korean Intellectual Property Office, the disclosure of which is incorporated herein by reference.

BACKGROUND

1. Field

Embodiments of the present invention relate to a moving robot and a method of controlling the same, and more particularly, to a moving robot that moves to a position indicated by a remote device and a method for controlling the same.

2. Related Art

Recently, the use of robots in the home is a trend that is gradually expanding. A representative example of such household robots is a cleaning robot. A cleaning robot is a device that automatically cleans a cleaning space by inhaling foreign substances such as dust accumulated on the floor while moving itself within a certain area.

In the case of a conventional cleaning robot, when a user desires that a particular position of a cleaning space be cleaned first, the user should directly determine the position of the cleaning robot and move the cleaning robot to the particular position using a remote device.

Accordingly, when the user is not aware of the position of the cleaning robot, the user should find the cleaning robot, and the cleaning robot is difficult to find when the cleaning robot is cleaning, for example, a cleaning area below a sofa or a bed.

SUMMARY

Therefore, it is an aspect of the present invention to provide a moving robot that moves to a position indicated by a remote device by detecting an optical signal transmitted from the remote device, and a method for controlling the same.

It is another aspect of the present invention to provide a moving robot that avoids collision with an obstacle while following a position indicated by a remote device, and a method for controlling the same.

Additional aspects of the invention will be set forth in part in the description which follows and, in part, will be obvious from the description, or may be learned by a practice of the invention.

In accordance with one aspect of the present invention, a moving robot includes: a traveling unit that moves (propels) a main body of the robot; a light reception unit that receives light; and a control unit that determines a traveling direction by filtering the light received from the light reception unit in accordance with a probability-based filtering method, and controls the traveling unit so that the main body travels in the traveling direction.

Here, the control unit may sample particles, assign a weight to each of the sampled particles, reselect particles based on the weight, and determine the traveling direction of the moving robot based on a weight average value of arrangement angle information of the reselected particles.

Also, the control unit may include a sampling unit that samples particles, a weight calculation unit that assigns a weight to each of the sampled particles, and a resampling unit that reselects particles based on the weight, and determine the traveling direction of the moving robot based on a weight average value of arrangement angle information of the reselected particles.

Also, the sampling unit may sample the particles in accordance with Gaussian distribution with respect to each of the particles.

Also, the weight calculation unit may assign the weight to each of the particles based on a difference between an arrangement angle of the light reception unit and the arrangement angle of the particles with respect to a front side of the moving robot.

Also, the weight calculation unit may assign the weight to each of the particles so that the difference between the arrangement angle of the light reception unit having received the light and the arrangement angle of the particles with respect to the front side of the moving robot is inversely proportional to the weight assigned to each of the particles.

Also, when a plurality of light reception units receive an optical signal, the arrangement angle of the light reception units may include an imaginary arrangement angle determined based on arrangement angle information of the plurality of light reception units.

Also, the resampling unit may reselect the particles having the weight of a probabilistically preset reference or more based on the weight assigned to each of the particles.

Also, when the light reception unit receives separate light, the control unit may determine the traveling direction of the moving robot by filtering a plurality of light received by the light reception unit in accordance with the probability-based filtering method.

Also, the control unit may further include a particle initialization unit that reselects a plurality of particles to have the same weight.

Also, the control unit may determine the traveling direction by filtering the light received by the light reception unit in accordance with the probability-based filtering method using a Bayes filter.

Also, the Bayes filter may include at least one of a Kalman filter, an EKF (extended Kalman filter), a UKF (unscented Kalman filter), an information filter, a histogram filter, and a particle filter.

Also, the moving robot may further include an obstacle detection unit that detects an obstacle, wherein the control unit may control the traveling unit so that the main body follows an outline of the obstacle in accordance with a position of the obstacle and the determined traveling direction, when the obstacle is detected.

Also, the control unit may control the traveling unit to perform any one of right follow traveling in which the moving robot travels to allow a right side of the main body to face the obstacle and left follow traveling in which the moving robot travels to allow a left side of the main body to face the obstacle.

In accordance with another aspect of the present invention, a method for controlling a moving robot includes: receiving light by a light reception unit; determining a traveling direction of the moving robot by filtering the received light in accordance with a probability-based filtering method; and performing traveling along the determined traveling direction.

Here, the determining of the traveling direction may include sampling particles, assigning a weight to each of the sampled particles, reselecting particles based on the weight, and determining the traveling direction of the moving robot based on a weight average value of arrangement angle information of the reselected particles.

Also, the sampling of the particles may include sampling the particles in accordance with Gaussian distribution with respect to each of the particles.

Also, the assigning of the weight to each of the sampled particles may include assigning the weight to each of the particles based on a difference between an arrangement angle of the light reception unit and the arrangement angle of the particles with respect to a front side of the moving robot.

Also, the assigning of the weight to each of the sampled particles may include assigning the weight to each of the particles so that the difference between the arrangement angle of the light reception unit and the arrangement angle of the particles with respect to the front side of the moving robot is inversely proportional to the weight assigned to each of the particles.

Also, when a plurality of light reception units receive an optical signal, the method for controlling the moving robot may further include determining an imaginary arrangement angle of the light reception unit based on arrangement angle information of the plurality of light reception units.

Also, the reselecting of the particles based on the weight may include reselecting the particles having the weight of a probabilistically preset reference or more based on the weight assigned to each of the particles.

Also, when the light reception unit receives separate light, the determining of the traveling direction may include determining the traveling direction of the moving robot by filtering a plurality of light received by the light reception unit in accordance with the probability-based filtering method.

Also, the determining of the traveling direction may include reselecting a plurality of particles to have the same weight.

Also, the determining of the traveling direction may include determining the traveling direction of the moving robot by filtering the received light in accordance with the probability-based filtering method using a Bayes filter.

Also, the determining of the traveling direction may include determining the traveling direction by filtering the received light in accordance with the probability-based filtering method including at least one of Kalman filter, an EKF, a UKF, an information filter, a histogram filter, and a particle filter.

Also, the performing of the traveling along the determined traveling direction may include detecting an obstacle during the traveling, and performing traveling so that the main body of the moving robot follows an outline of the obstacle in accordance with a position of the obstacle and the determined traveling direction.

Also, the performing of the traveling along the determined traveling direction may include performing any one of traveling in which the moving robot travels to allow a right side of the main body to face the obstacle and traveling in which the moving robot travels to allow a left side of the main body to face the obstacle.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
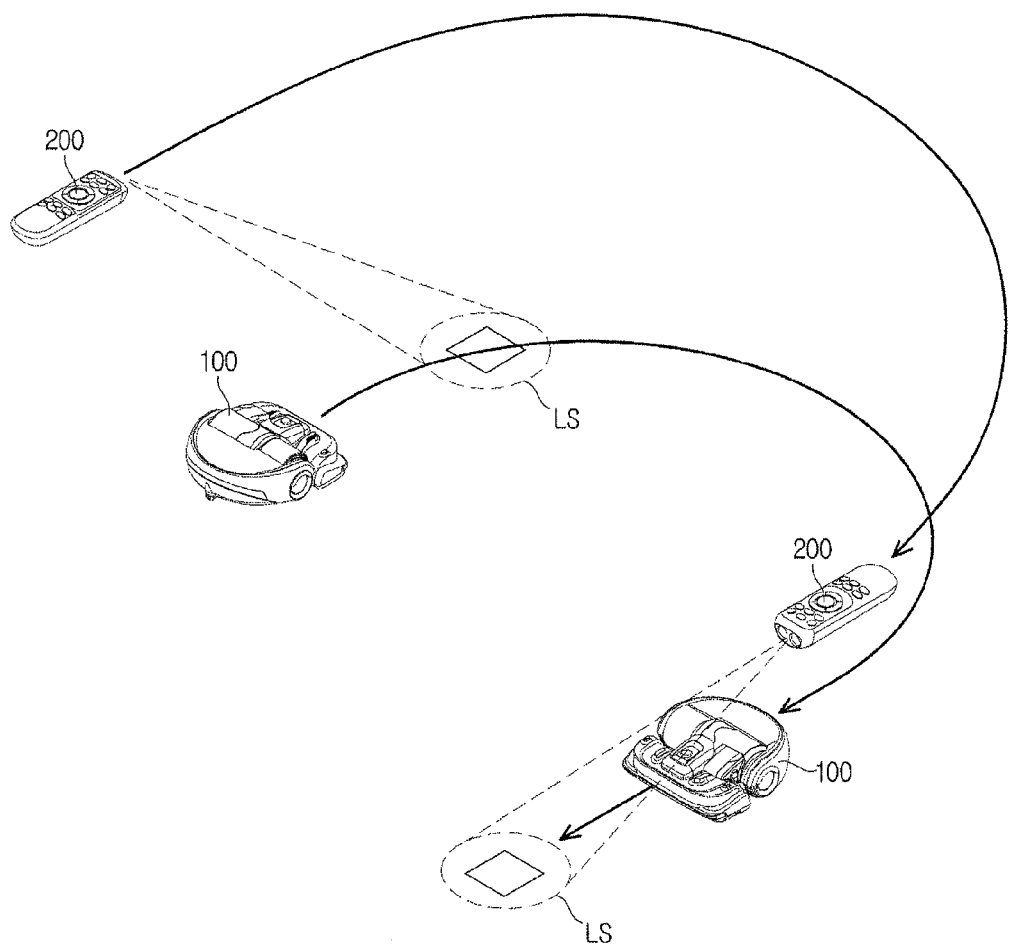
FIG. 1 is a diagram illustrating operations of a cleaning robot and a remote device in accordance with one embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Hereinafter, a moving robot and a method for controlling the moving robot will be described with reference to the accompanying drawings. In addition, a cleaning robot will be assumed and described as a representative example of a moving robot in accordance with the disclosed embodiment of the present invention. However, examples of the moving robot are not limited to the cleaning robot described later.

Figure 2:
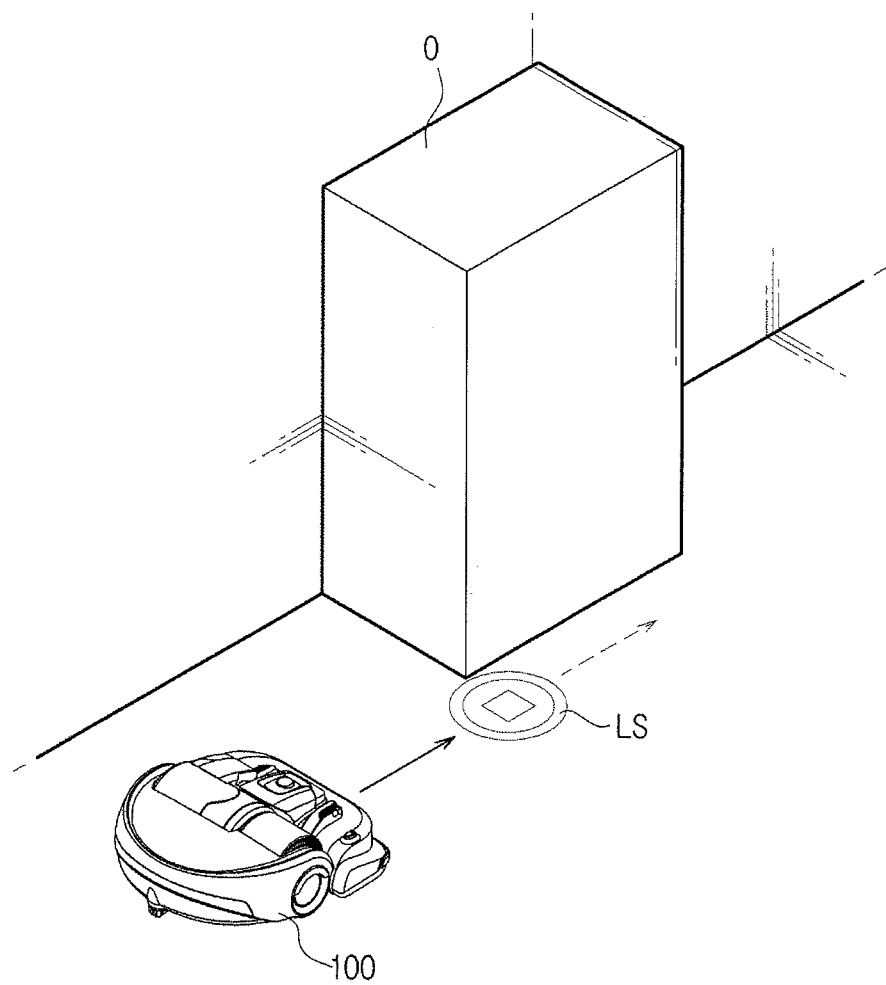
FIGS. 2 to 4 are diagrams illustrating an example in which a cleaning robot is traveling a cleaning space.
Figure 3:
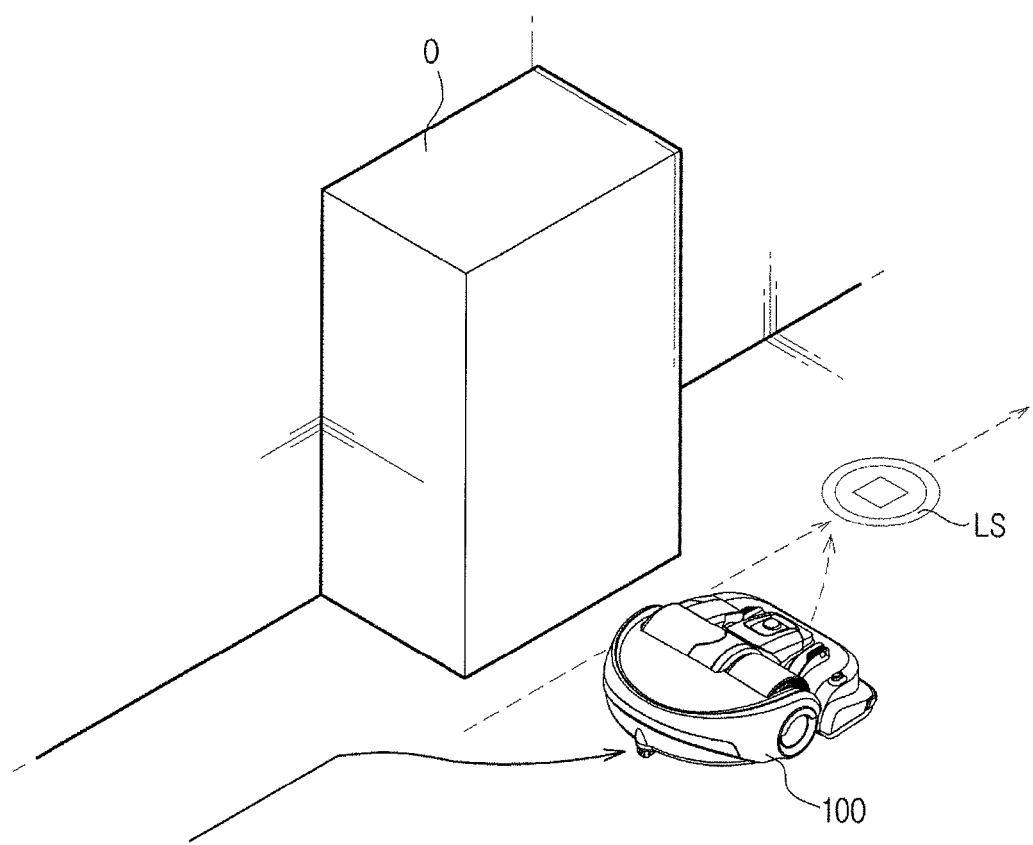
Figure 4:
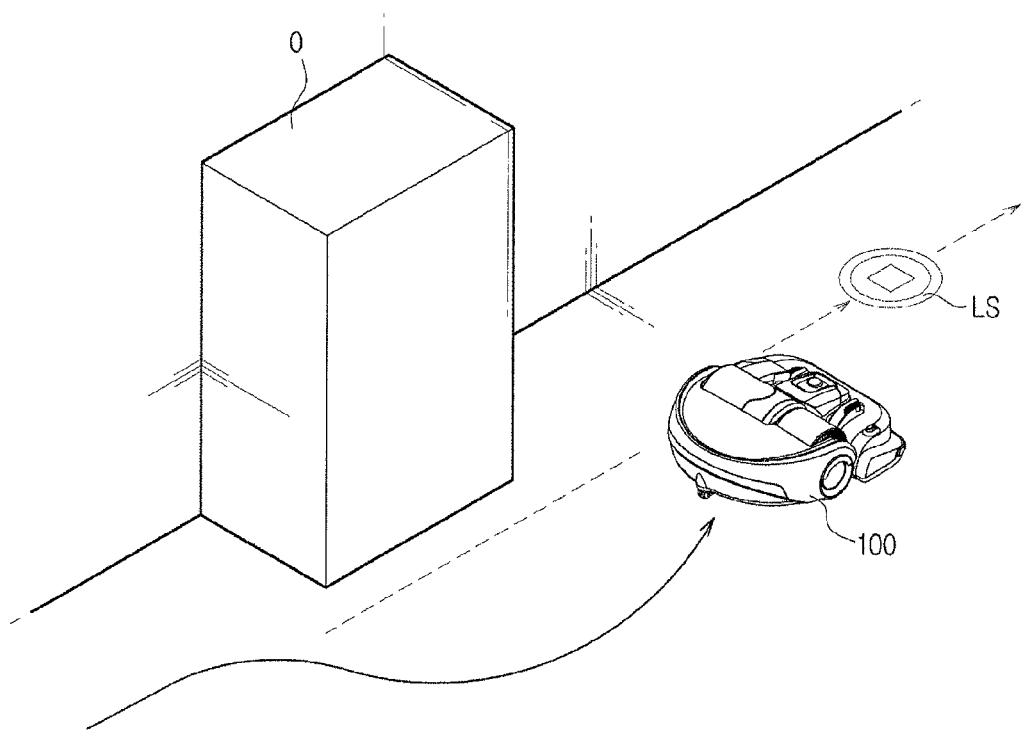

FIG. 1 is a diagram illustrating operations of a cleaning robot and a remote device in accordance with one embodiment of the present invention, and FIGS. 2 to 4 are diagrams illustrating an example in which a cleaning robot is traveling a cleaning space.

Referring to FIGS. 1 to 4, operations of a cleaning robot 100 and a remote device 200 in accordance with one embodiment of the present invention will be simply described.

The cleaning robot 100 may clean a cleaning area while traveling the cleaning area, and the remote device 200 may receive a control command for the cleaning robot 100 from a user, and transmit the received control command to the cleaning robot 100. Specifically, the remote device 200 may modulate light in response to the control command input by the user, and emit the modulated light.

The remote device 200 may emit a variety of types of light in order to transmit the control command to the cleaning robot 100, and hereinafter, description will be made assuming that the type of light emitted to the cleaning robot 100 by the remote device 200 is infrared rays.

A user may input the control command to the cleaning robot 100 using the remote device 200, and also indicate a position to which the cleaning robot 100 is to move using the remote device 200.

For example, when the user inputs a drag command, the remote device 200 may modulate infrared rays in response to the drag command, and then emit the modulated infrared rays. After receiving the modulated infrared rays, the cleaning robot 100 may demodulate the received infrared rays, and thereby may receive the drag command of the user. When the drag command is input, the cleaning robot 100 may move in a direction in which the modulated infrared rays are received. In other words, the cleaning robot 100 may follow a position indicated by the user using the remote device 200. The infrared rays emitted by the remote device 200 in this manner may provide the position indicated by the user to the cleaning robot 100 as well as transmitting the control command to the cleaning robot 100. Hereinafter, in the present specification, a method in which the cleaning robot 100 performs cleaning while moving towards the position indicated by the user may be referred to as a point cleaning method.

According to an embodiment, the remote device 200 may emit visible light in order to display the position indicated by the remote device 200 to the user. The user may indicate the position to which the cleaning robot 100 is to move using the remote device 200, and the remote device 200 may emit visible light towards the position indicated by the user.

The visible light or infrared rays emitted by the remote device 200 may be projected onto a cleaning floor to form a light spot LS, as illustrated in FIG. 1, so that the user and the cleaning robot 100 may recognize the position indicated by the remote device 200 through the light spot LS.

When the user changes the indicated position using the remote device 200, the cleaning robot 100 may redetect the position indicated by the remote device 200, and move towards the redetected position. In other words, the cleaning robot 100 may perform drag traveling for following the position indicated by the remote device 200, that is, the light spot LS.

When detecting an obstacle O on a traveling path while following the light spot LS, the cleaning robot 100 may perform outline follow traveling for avoiding a collision with the obstacle O.

For example, the cleaning robot 100 may perform drag traveling that follows the light spot LS as illustrated in FIG. 2. Specifically, the cleaning robot 100 may detect the light spot LS, and move in such a manner to allow the detected light spot LS to be positioned in front of the cleaning robot 100.

In addition, the cleaning robot 100 may retrieve the obstacle O on the traveling path while performing drag traveling. For example, when detecting the obstacle O on the traveling path, the cleaning robot 100 may perform outline follow traveling for following the outline of the obstacle O in order to avoid the collision with the obstacle O as illustrated in FIG. 3.

In addition, the cleaning robot 100 may determine whether the position of the light spot LS becomes away from the obstacle O while performing outline follow traveling. For example, when it is determined that the position of the light spot LS becomes away from the obstacle O, the cleaning robot 100 stops outline follow traveling for following the outline of the obstacle O and perform drag traveling for following the light spot LS, as illustrated in FIG. 4.

As described above, the operations of the cleaning robot 100 and the remote device 200 have been briefly described.

Hereinafter, specific configuration and operations of the cleaning robot 100 and the remote device 200 will be described.

Figure 5:
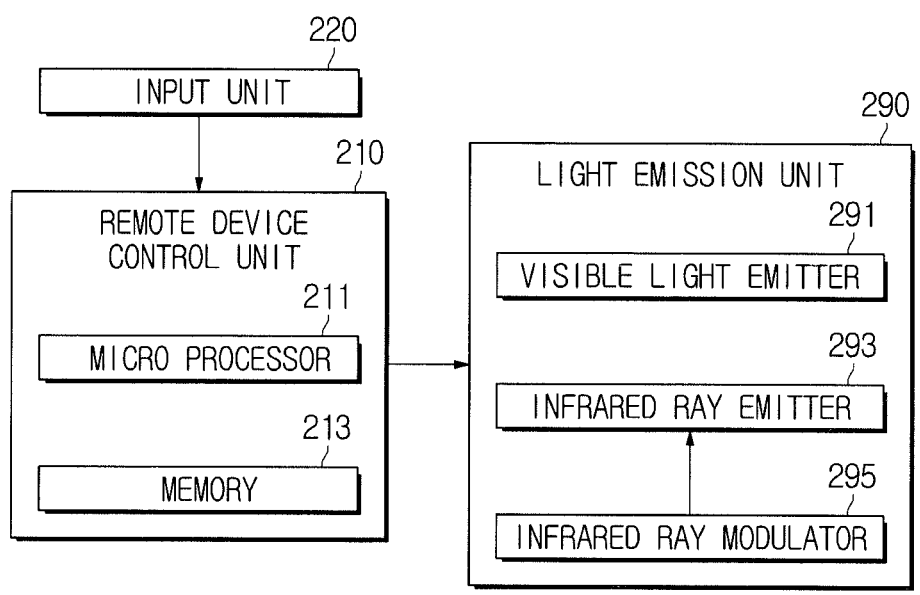
FIG. 5 is a diagram illustrating a control configuration of a remote device in accordance with one embodiment of the present invention.
Figure 6:
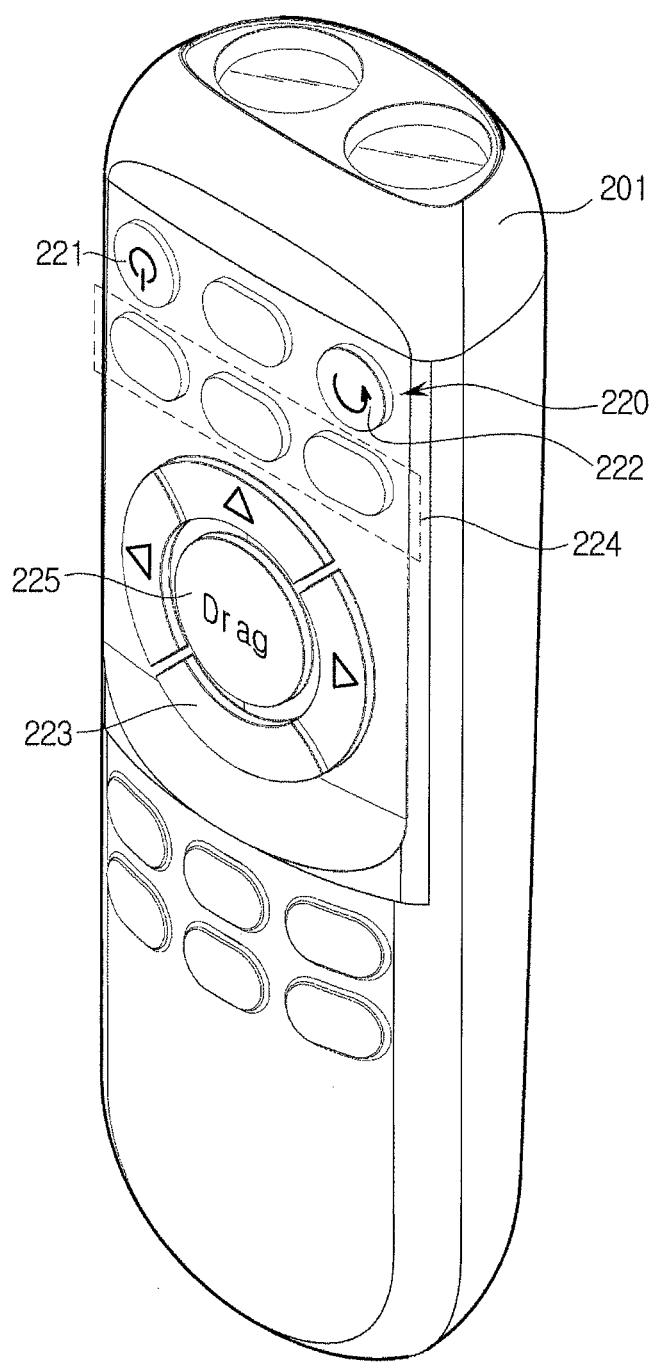
FIG. 6 is a diagram illustrating the appearance of a remote device in accordance with one embodiment of the present invention.

FIG. 5 is a diagram illustrating a control configuration of a remote device in accordance with one embodiment of the present invention, and FIG. 6 is a diagram illustrating the appearance of a remote device in accordance with one embodiment of the present invention.

Referring to FIGS. 5 and 6, the remote device 200 includes an input unit 220 that receives a control command from a user, a light emission unit 290 that emits visible light and infrared rays, and a remote device control unit 210 that controls the light emission unit 290 so that visible light and infrared rays are emitted in response to the control command of the user.

The input unit 220 may be provided on a top surface of a main body 201 that forms the appearance of the remote device 200, and receive a control command from a user.

The input unit 220 may include a power button 221 for turning ON/OFF the cleaning robot 100, a return button 222 for returning the cleaning robot 100 to a charging station (not illustrated) for charging of a power source, an operation/stop button 223 for operating and stopping the cleaning robot 100, a plurality of cleaning mode buttons 224 for selecting a cleaning mode of the cleaning robot 100, and the like. In particular, the input unit 220 may include a drag button 225 for inputting a drag command for moving the cleaning robot 100 along a movement path indicated by the user.

The respective buttons included in the input unit 220 may adopt a push switch for detecting user's pressure, a membrane switch, or a touch switch for detecting a contact of a user's body part.

Meanwhile, according to an embodiment, the remote device 200 may further include a touch screen that receives the control command from a display for displaying operation information of the cleaning robot 100 in response to the control command input by the user or from the user and displays the operation information of the cleaning robot 100 in response to the received control command.

The light emission unit 290 modulates infrared rays in response to the control command input by the user, and emits the modulated infrared rays. For example, the light emission unit 290 may emit a first infrared pulse and a second infrared pulse in response to the control command in the determined order.

In addition, the light emission unit 290 may emit visible light so as to display a position indicated by the remote device 100. The user may designate a position to which the cleaning robot 100 is to move using the remote device 100, and the remote device 100 may emit visible light so as to display the position indicated by the user.

The light emission unit 290 may include a visible light emitter 291 that emits visible light recognized by the user, an infrared ray emitter 293 that emits infrared ray recognized by the cleaning robot 200, and an infrared ray modulator 295 that modulates infrared rays to be emitted by the infrared ray emitter 293.

According to an embodiment, the infrared rays emitted by the light emission unit 290 may be modulated by the control command input by the user. For example, the light emission unit 290 may emit infrared rays in the form of a pulse whose pulse width is modulated in response to the control command input by the user. The configuration and operation of the light emission unit 290 will be described in more detail later.

The remote device control unit 210 controls the overall operations of the remote device 200. Specifically, the remote device control unit 210 may control the light emission unit 290 to emit the infrared rays modulated in response to the control command input by the user.

For example, the remote device control unit 210 may control the light emission unit 290 to emit visible light and infrared rays modulated in response to the drag command when a user inputs a drag command, and control the light emission unit 290 to emit infrared rays modulated in response to an operation/stop command when a user inputs the operation/stop command.

Such a remote device control unit 210 may include a memory 213 that stores a control program and control data for controlling the operation of the remote device 200 and a microprocessor 211 that performs an association operation in accordance with the control program and control data stored in the memory 213.

The memory 213 may include a non-volatile memory that can semipermanently store the control program and the control data such as a fresh memory, an EPROM (erasable programmable read only memory), an EEPROM (electrically erasable programmable read only memory), or the like, and a volatile memory that can temporarily store the control program and the control data such as an SRAM (static random access memory, a DRAM (dynamic random access memory), or the like.

The microprocessor 211 may perform an association operation in accordance with the control program and control data stored in the memory 213.

For example, the microprocessor 211 may process an electrical signal received from the input unit 220, and output a control signal to the light emission unit 290 in accordance with the processing result. An operation of the remote device 200 which will be described as below may be performed by a control operation of the remote device control unit 210.

Hereinafter, the configuration of the light emission unit 290 will be described in more detail.

Figure 7A:
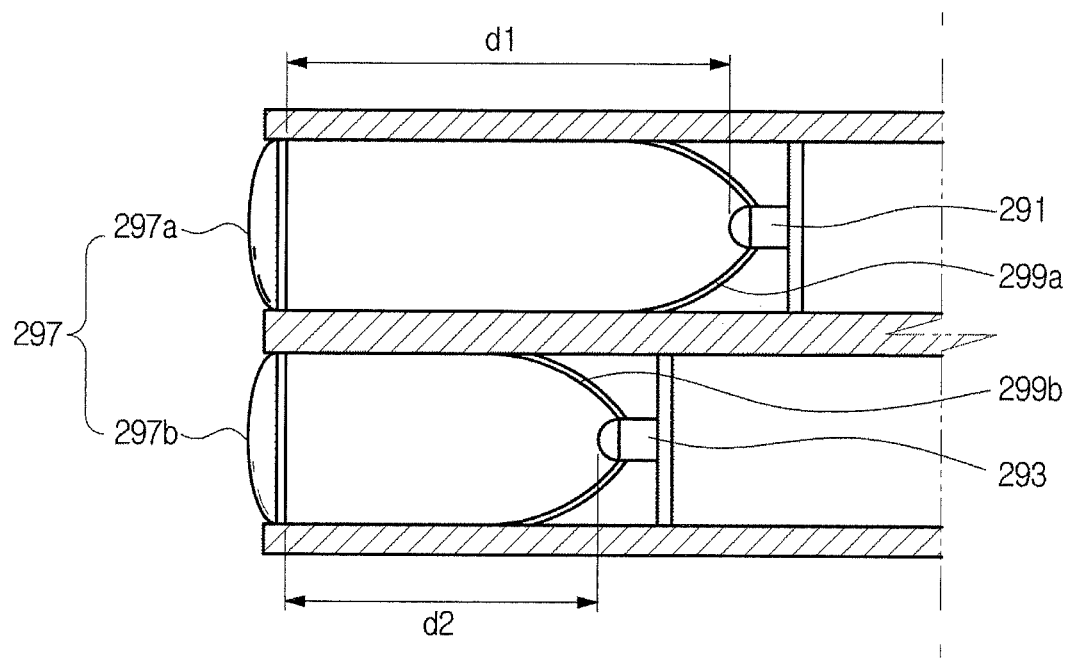
FIGS. 7A-7B are diagrams illustrating a light emission unit included in a remote device in accordance with one embodiment of the present invention.
Figure 7B:
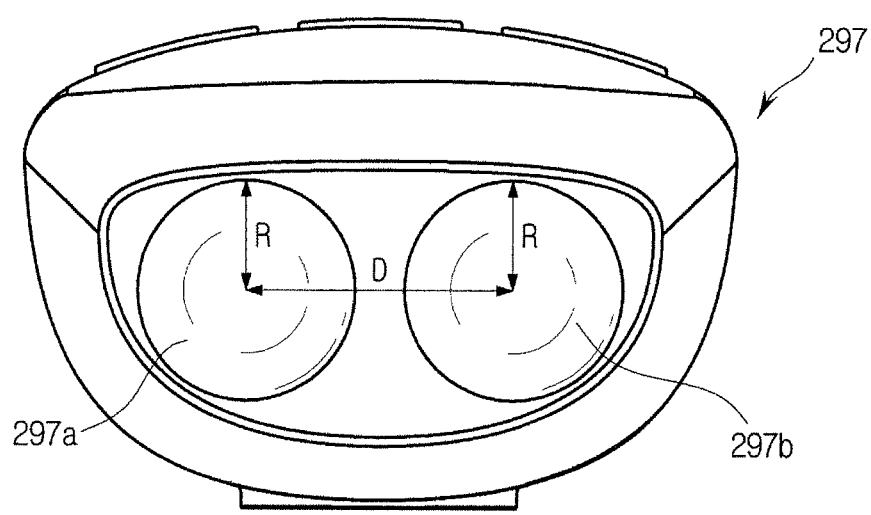
Figure 8:
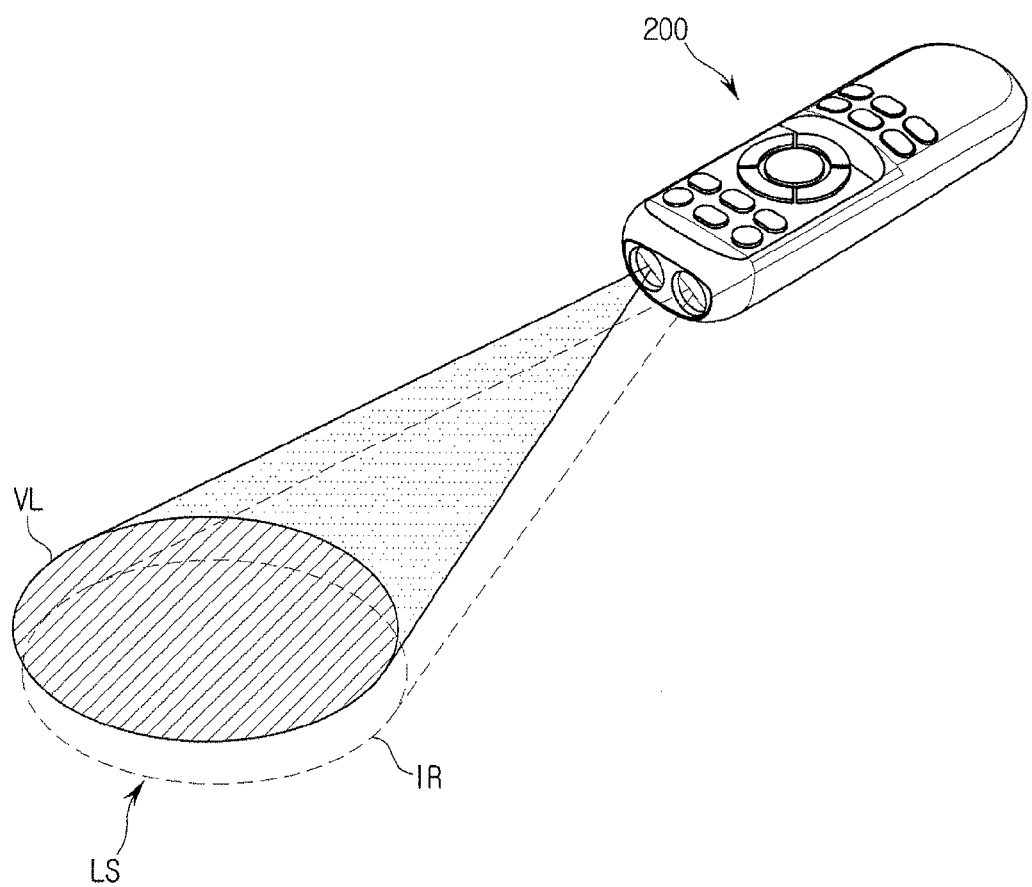
FIG. 8 is a diagram illustrating a light spot generated in a manner that a remote device irradiates a cleaning area with light in accordance with one embodiment of the present invention.
Figure 9:
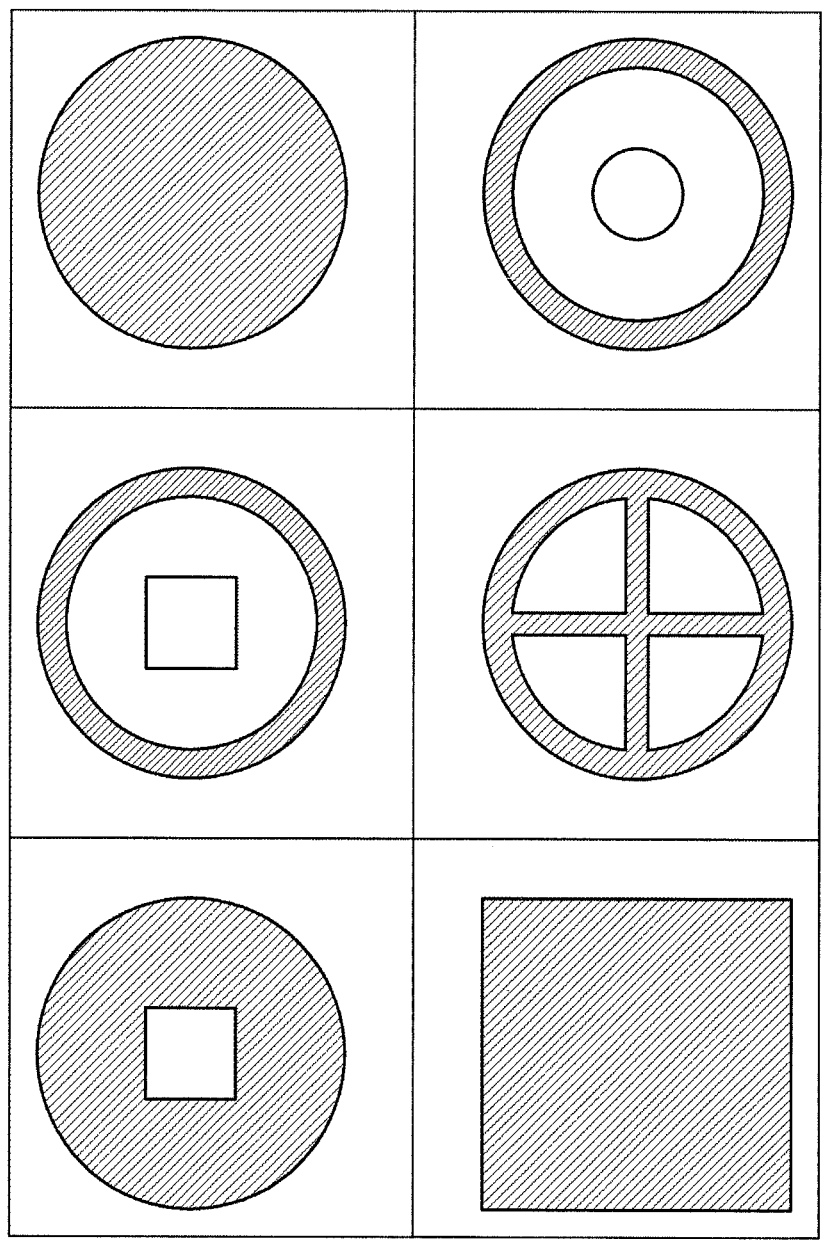
FIG. 9 is a diagram illustrating an example of a light spot generated by a remote device in accordance with one embodiment of the present invention.

FIGS. 7A and 7B are diagrams illustrating a light emission unit included in a remote device in accordance with one embodiment of the present invention, FIG. 8 is a diagram illustrating a light spot generated in a manner that a remote device irradiates a cleaning area with light in accordance with one embodiment of the present invention, and FIG. 9 is a diagram illustrating an example of a light spot generated by a remote device in accordance with one embodiment of the present invention.

Referring to FIGS. 7A to 9, the light emission unit 290 may further include reflecting plates 299a and 299b and a lens module 297 in addition to the visible light emitter 291, the infrared ray emitter 293, and the infrared ray modulator 295 described above.

The visible light emitter 291 may emit visible light in accordance with the control signal output by the remote device control unit 210. Such a visible light emitter 291 may adopt a visible light LED (light emitting diode) or a visible light laser diode which emits visible light.

The infrared ray emitter 293 emits infrared rays modulated in accordance with a modulation signal output by the infrared ray modulator 295. Such an infrared ray emitter 293 may adopt an infrared ray LED that emits infrared rays or an infrared ray laser diode.

The infrared ray modulator 295 outputs the modulation signal for modulating infrared rays in response to the control command input by the user.

Specifically, the infrared ray modulator 295 may generate a pulse width modulation signal for modulating a width of an infrared pulse in response to the control command input by the user.

The infrared ray emitter 293 may output the first infrared pulse having a first pulse width so as to transmit data "1", and in this instance, the infrared ray modulator 295 may transmit a first modulation signal to the infrared ray emitter 293 so that the first infrared pulse is output.

In addition, the infrared ray emitter 293 may output a second infrared pulse having a second pulse width so as to transmit data "0", and in this instance, the infrared ray modulator 295 may transmit a second modulation signal to the infrared ray emitter 293 so that the second infrared pulse is output. For example, when signals corresponding to the control command are "0100", the infrared ray modulator 295 may output the second modulation signal, the first modulation signal, the second modulation signal, and the second modulation signal in the stated order. A modulation method of infrared rays is not limited to pulse width modulation, and obviously, the intensity or frequency of infrared rays may be modulated.

Reflecting plates 299a and 299b may include a first reflecting plate 299a that reflects visible light so that the visible light emitted by the visible light emitter 291 is concentrated, and a second reflecting plate 299b that reflects infrared rays so that infrared rays emitted by the infrared ray emitter 293 is concentrated.

The reflecting plates 299a and 299b may be formed in a conical shape whose inclined plane is convexly formed so as to have a parabolic cross-section thereof so that visible light and infrared rays are concentrated, and according to an embodiment, the reflecting plates 299a and 299b may be made of a metallic material which has excellent reflection efficiency of the visible light and infrared rays.

The lens module 297 may include a first lens 297a that refracts visible light so that visible light emitted by the visible light emitter 291 is concentrated, and a second lens 297b that refracts infrared rays so that infrared rays emitted by the infrared ray emitter 293 is concentrated. Each lens of the lens module 297 may adopt a convex lens that concentrates and outputs incident light.

By such reflecting plates 299a and 299b and lens module 297, the visible light emitted by the visible light emitter 291 may be visible light in the form of a beam, and the infrared rays emitted by the infrared ray emitter 293 may be infrared rays in the form of a beam.

When the light emission unit 290 irradiates the floor of the cleaning area with visible light and infrared rays, the irradiated visible light and infrared rays may be projected onto the floor of the cleaning area, and therefore a visible light spot VL and an infrared ray spot IR may be formed on the floor of the cleaning area as illustrated in FIG. 8.

A user may recognize a position indicated by the remote device 200 through the visible light spot VL, and the cleaning robot 100 may recognize a position indicated by the remote device 200 through the infrared ray spot IR.

In addition, the infrared rays emitted by the light emission unit 290 of the remote device 200 may be modulated by the control command of the user, and the cleaning robot 100 may demodulate the modulated infrared rays and recognize the control command of the user.

The infrared ray emitted by the remote device 200 in this manner may include information about the control command of the user and the position indicated by the user, so that the remote device 200 may simultaneously transmit two pieces of information to the cleaning robot 100 using the infrared rays. As a result, it is unnecessary that an infrared ray emitter for transmitting the control command of the user and an infrared ray emitter for showing the position indicated by the user should be separately provided.

In addition, the visible light spot VL and the infrared ray spot IR may be overlapped with each other so that the position recognized by the user and the position recognized by the cleaning robot 100 are the same. In addition, the visible light spot VL and the infrared ray spot IR may be overlapped with each other to form the light spot LS.

According to an embodiment, a diameter R of each of the first lens 297a and the second lens 297b, a distance d1 between the first lens 297a and the visible light emitter 291, and a distance d2 between the second lens 297b and the infrared ray emitter 293 may be adjusted so that the visible light spot VL and the infrared ray spot IR are maximally overlapped with each other.

For example, light may be more concentrated along with an increase in the size R of each of the first lens 297a and the second lens 297b, and therefore the visible light spot VL and the infrared ray spot IR may become brighter, whereas the sizes of the visible light spot VL and the infrared ray spot IR may be reduced.

In addition, as the distance d1 between the first lens 297a and the visible light emitter 291 and the distance d2 between the second lens 297b and the infrared ray emitter 293 are increased, the visible light spot VL and the infrared ray spot IR may become brighter, whereas the sizes of the visible light spot VL and the infrared ray spot IR may be reduced.

Accordingly, it is preferable that the diameter of the lens module 297 and the distance between the lens module 297 and the visible light emitter 291 or the infrared ray emitter 293 be appropriately adjusted so as to form the light spot having appropriate brightness and size. According to an embodiment, the diagram R of each of the first lens 297a and the second lens 297b may be adjusted to be 15 mm or less, the distance d1 between the first lens 297a and the visible light emitter 291 may be adjusted to be 30 mm or less, and the distance d2 between the second lens 297b and the infrared ray emitter 293 may be adjusted to be 40 mm or less. The wavelength of the visible light and the wavelength of the infrared rays are different from each other, and therefore the distance d1 between the first lens 297a and the visible light emitter 291 and the distance d2 between the second lens 297b and the infrared ray emitter 293 may be different from each other.

Meanwhile, in order to increase a rate at which the visible light spot VL and the infrared ray spot IR are overlapped with each other, a distance D between the center of the first lens 297a and the center of the second lens 297b may be adjusted. According to an embodiment, when the diagram R of each of the first lens 297a and the second lens 297b, the distance d1 between the first lens 297a and the visible light emitter 291, and the distance d2 between the second lens 297b and the infrared ray emitter 293 are set as described above, the distance D between the center of the first lens 297a and the center of the second lens 297b may be adjusted to be 20 mm or less.

Meanwhile, according to an embodiment, the light spot LS may have a variety of types as illustrated in FIG. 9, so that a user may clearly recognize the position indicated by the remote device 200.

Specifically, the visible light spot VL may have a variety of types so that the user may recognize the position indicated by the remote device 200 through the visible light spot VL. For this, a pattern corresponding to a shape of the light spot LS illustrated in FIG. 9 may be formed in the first lens 297a, or an optical member (not illustrated) in which a non-transparent pattern corresponding to the shape of the light spot LS illustrated in FIG. 9 is formed may be provided between the first lens 297a and the visible light emitter 291.

As described above, the configuration and operation of the remote device 200 have been described.

Next, the configuration and operation of the cleaning robot 100 will be described.

Figure 10:
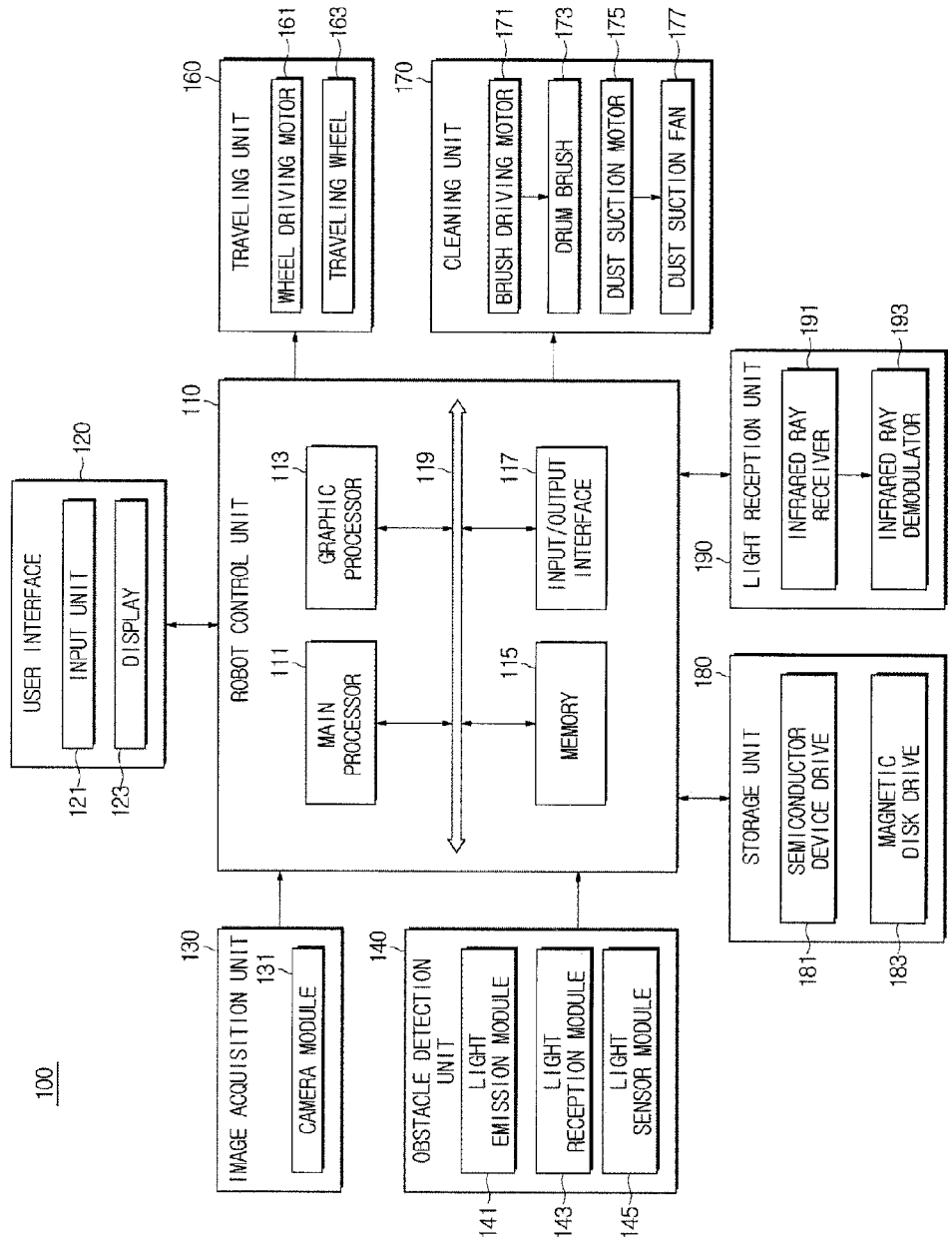
FIG. 10 is a diagram illustrating a control configuration of a cleaning robot in accordance with one embodiment of the present invention.
Figure 11:
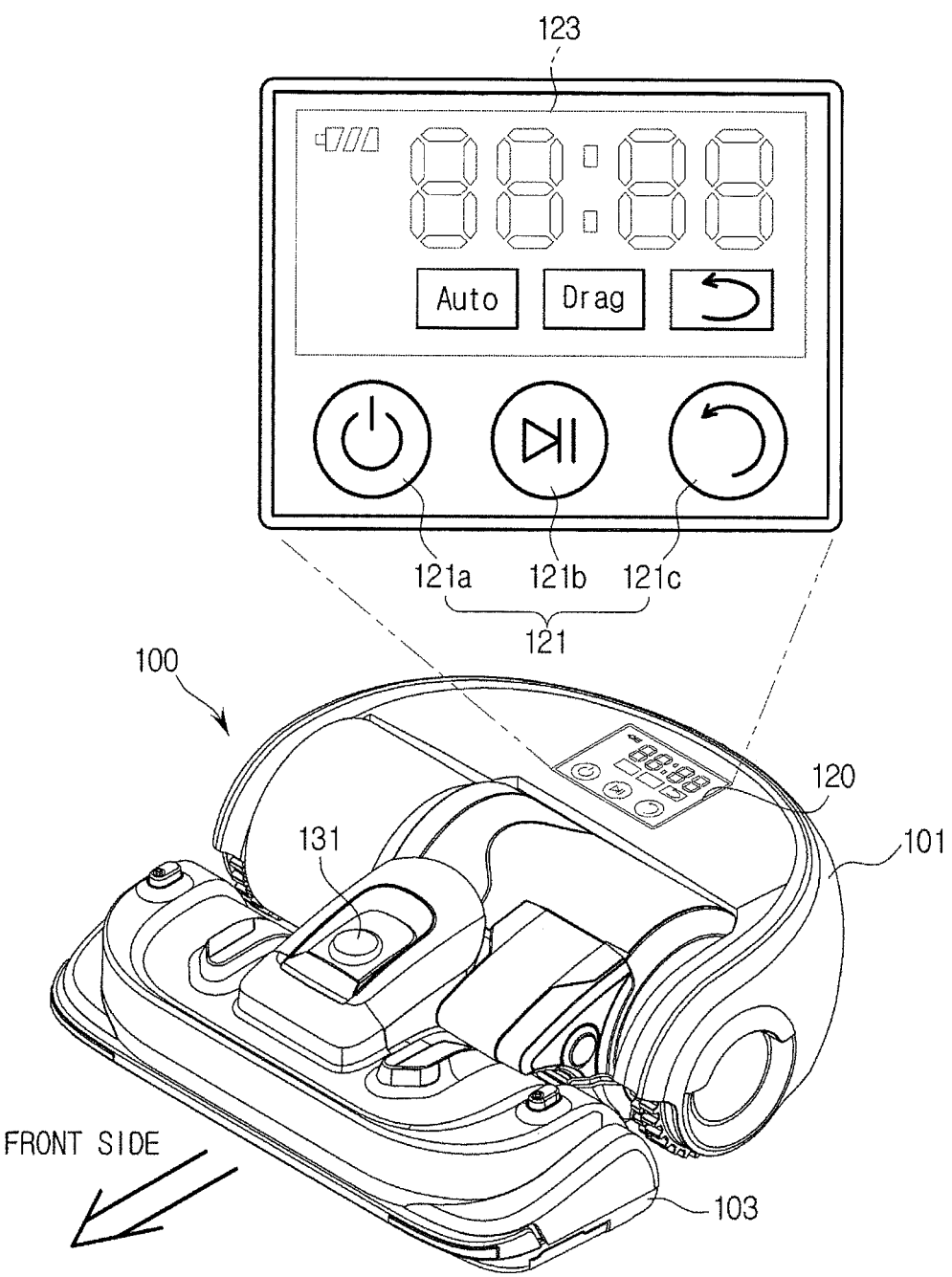
FIG. 11 is a diagram illustrating the appearance of a cleaning robot in accordance with one embodiment of the present invention.
Figure 12:
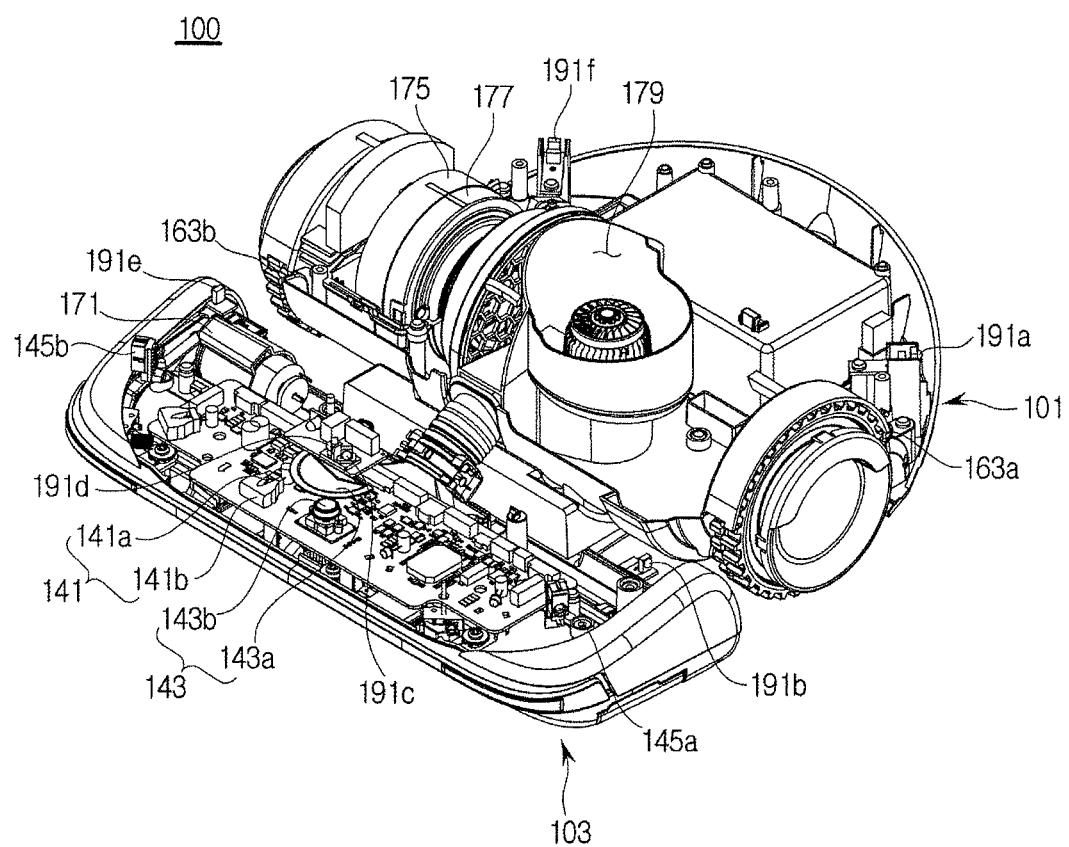
FIGS. 12 and 13 are diagrams illustrating the inside of a cleaning robot in accordance with one embodiment of the present invention.
Figure 13:
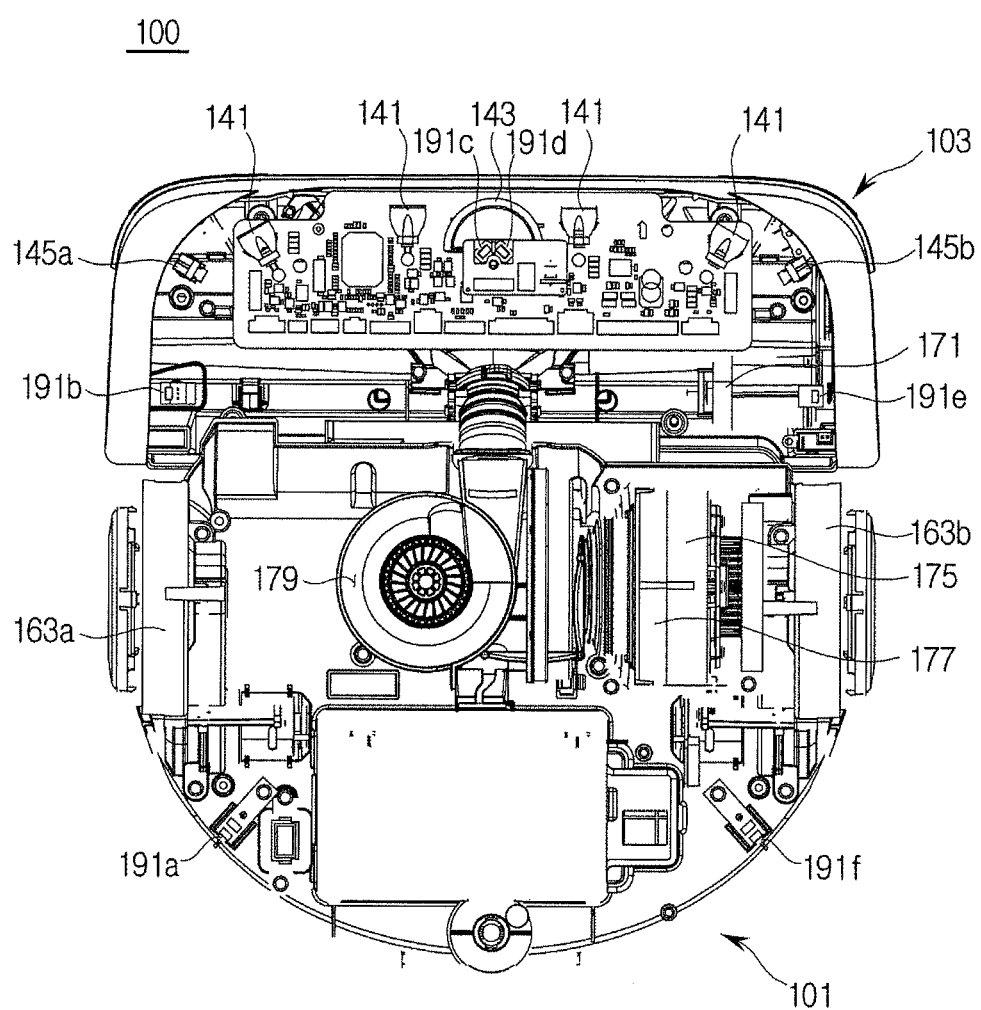
Figure 14:
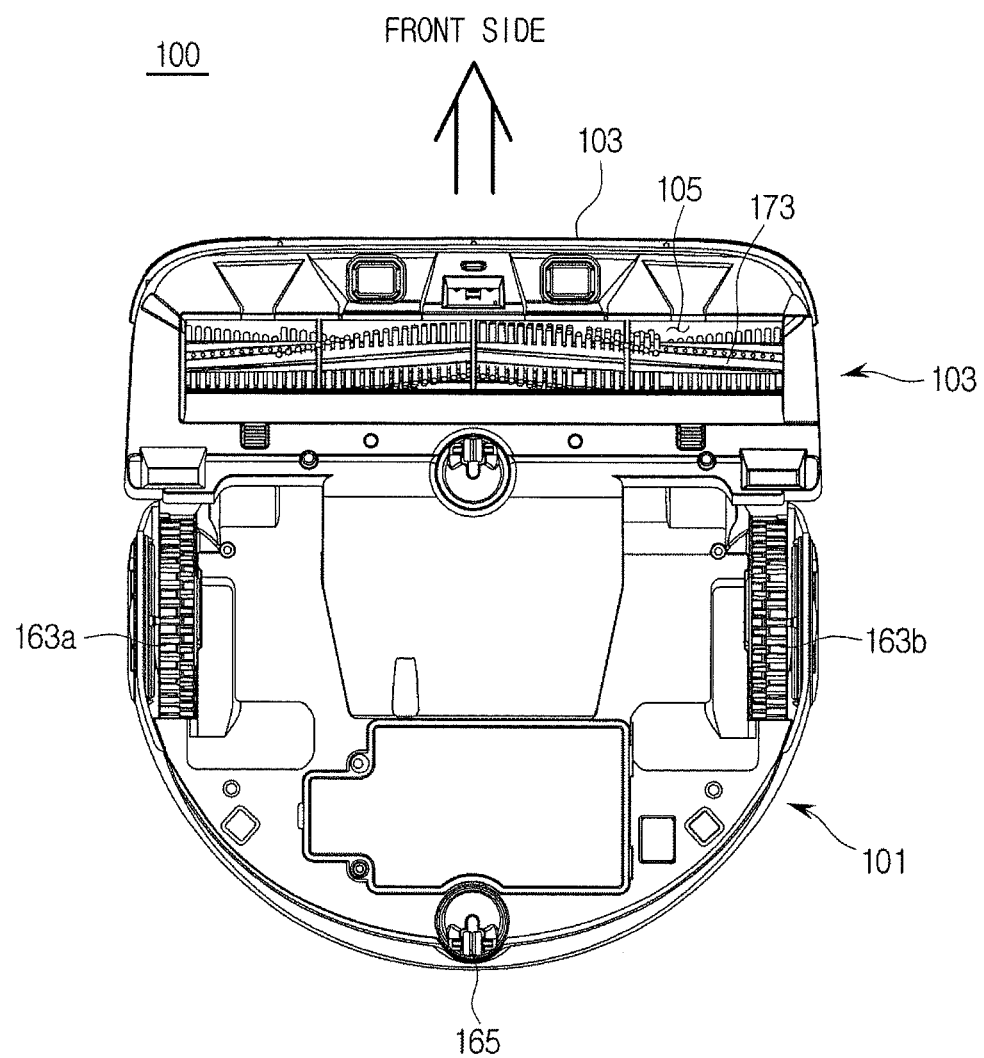
FIG. 14 is a diagram illustrating a bottom surface of a cleaning robot in accordance with one embodiment of the present invention.

FIG. 10 is a diagram illustrating a control configuration of a cleaning robot in accordance with one embodiment of the present invention, FIG. 11 is a diagram illustrating the appearance of a cleaning robot in accordance with one embodiment of the present invention, FIGS. 12 and 13 are diagrams illustrating the inside of a cleaning robot in accordance with one embodiment of the present invention, and FIG. 14 is a diagram illustrating a bottom surface of a cleaning robot in accordance with one embodiment of the present invention.

Referring to FIGS. 10 to 14, the cleaning robot 100 may include a main body 101 and a sub body 103. As illustrated in FIG. 11, the main body 101 may have a substantially semi-cylindrical shape, and the sub body 103 may have a rectangular parallelepiped shape.

Inside and outside the main body 101 and the sub body 103, components for realizing the function of the cleaning robot 100 may be provided.

Specifically, the cleaning robot 100 may include a user interface 120 that interacts with a user, an image acquisition unit 130 that acquires an image of the periphery of the cleaning robot 100, an obstacle detection unit 140 that detects an obstacle O, a traveling unit 160 that moves the cleaning robot 100, a cleaning unit 170 that cleans a cleaning area, a storage unit 180 that stores a program and a variety of data, a light reception unit 190 that receives infrared rays emitted by the remote device 200, and a robot control unit 110 that controls the overall operations of the cleaning robot 100.

The user interface 120 may be provided on a top surface of the main body 101 of the cleaning robot 100 as illustrated in FIG. 11, and include an input unit 121 that receives a control command from a user and a display 123 that displays operation information of the cleaning robot 100.

The input unit 121 may include a power button 121*a* that turns ON/OFF the cleaning robot 100, an operation/stop button 121*b* that operates or stops the cleaning robot 100, a return button 121*c* that returns the cleaning robot 100 to a charging station (not illustrated), and the like.

The respective buttons included in the input unit 121 may adopt a push switch for detecting a user's pressure, a membrane switch, or a touch switch for detecting a contact of a user's body part.

The display 123 may display information of the cleaning robot 100 in response to the control command input by the user. For example, the display 123 may display information such as an operating state of the cleaning robot 100, a state of a power source, a cleaning mode selected by the user, whether to return to the charging station, and the like.

The display 123 may adopt an LED (light emitting diode) or an OLED (organic light emitting diode) capable of self-emitting, a liquid crystal display including a separate source, or the like.

According to an embodiment, the user interface 120 may adopt a TSP (touch screen panel) that receives a control command from a user and displays operation information corresponding to the received control command. Such a TSP may include a display for displaying the operation information and the control command input by the user, a touch panel for detecting coordinates of the contact of the user's body part, and a touch screen controller for determining the control command input by the user based on the coordinates of the contact detected by the touch panel.

The image acquisition unit 130 may include a camera module 131 that acquires the image of the periphery of the cleaning robot 100.

The camera module 131 may be provided on the top surface of the sub body 103 included in the cleaning robot 100, and include a lens for concentrating light emitted from the upper side of the cleaning robot 100 and an image sensor for converting light into an electrical signal. Such an image sensor may adopt a CMOS (complementary metal oxide semiconductor) sensor or a CCD (charge coupled device) sensor.

The camera module 131 may convert the image of the periphery of the cleaning robot 100 into an electrical signal that can be processed by the robot control unit 110, and transmit the electrical signal corresponding to the image to the robot control unit 110. The image provided by the image acquisition unit 130 may be used when the robot control unit 110 detects the position of the cleaning robot 100.

The obstacle detection unit 140 may detect an obstacle O preventing the movement of the cleaning robot 100. Here, the obstacle O refers to all that protrudes from the floor of the cleaning space and prevents the movement of the cleaning robot 100, and may be a concept including a wall surface for partitioning the cleaning space as well as furniture such as a table, a sofa, and the like.

The obstacle detection unit 140 may include a light emission module 141 that emits light toward the front of the cleaning robot 100, a light reception module 143 that receives light reflected by the obstacle O or the like, and a light sensor module 145 that emits light toward the side of the cleaning robot 100 and receives the light reflected by the obstacle O.

According to an embodiment, the cleaning robot 100 may use light such as infrared rays or the like in order to detect the obstacle O, but a method of detecting the obstacle O is not limited thereto, and obviously, ultrasonic waves or radio waves may be used.

The light emission module 141 may include a light source 141*a* that emits light as illustrated in FIGS. 12 and 13 and a wide-angle lens 141*b* that diffuses the emitted light in a direction parallel to the cleaning floor.

The light source 141*a* may adopt an LED for emitting light in various directions or a LASER (light amplification by simulated emission of radiation) diode.

The wide-angle lens 141*b* may be made of a material capable of transmitting light, and diffuses light emitted from the light source 141*a*, in a direction parallel to the cleaning floor using refraction or total reflection. The light emitted from the light emission module 141 may be diffused in the form of a fan toward the front of the cleaning robot 100 due to the wide-angle lens 141*b* (hereinafter, light that is diffused in the direction parallel to the cleaning floor and have a fan shape is referred to as planar light).

The obstacle detection unit 140 may include a plurality of light emission modules 141 as illustrated in FIGS. 12 and 13. This is to minimize a portion which the planar light emitted by the light emission module 141 does not reach.

The light reception module 143 may include a reflecting mirror 143*a* that concentrates the light reflected by the obstacle O and an image sensor 143*b* that receives light reflected by the reflecting mirror 143*a*.

The reflecting mirror 143*a* may be provided on the image sensor 143*b* as illustrated in FIGS. 12 and 13, and have a conical shape whose vertex is oriented toward the image sensor 143*b*. The reflecting mirror 143*a* may reflect the reflected light reflected by the obstacle O toward the image sensor 143*b*.

The image sensor 143*b* may be provided below the reflecting mirror 143*a*, and receive light reflected by the reflecting mirror 143*a*. Specifically, the image sensor 143*a* may acquire a two-dimensional image formed on the reflecting mirror 143*a* by the reflected light reflected by the obstacle O. Here, the image sensor 143*b* may be constituted of two-dimensional image sensors in which optical sensors are arranged in a two-dimensional manner.

The image sensor 143*b* may adopt a CMOS sensor or a CCD sensor, but the example of the image sensor 143*b* is not limited thereto.

The light sensor module 145 may include a left light sensor module 145*a* that obliquely emits light toward the left side of the cleaning robot 100 and receives light reflected by the obstacle O and a right light sensor module 145*b* that obliquely emits light toward the right side of the cleaning robot 100 and receives the light reflected by the obstacle O.

The light sensor module 145 may be a component that assists the light emission module 141 for detecting the obstacle O positioned in front of the cleaning robot 100 and the light reception module 143, and according to an embodiment, the obstacle detection unit 140 may not include the light sensor module 145.

The light sensor module 145 may be used in traveling of the cleaning robot 100 in addition to detection of the obstacle O. For example, when the cleaning robot 100 performs outline follow traveling for following the outline of the obstacle O while maintaining a constant distance from the obstacle O, the light sensor module 145 may detect a distance between the side surface of the cleaning robot 100 and the obstacle O, and the robot control unit 110 may control the traveling unit 160 so that the cleaning robot 100 maintains a constant distance from the obstacle O based on the detection result of the light sensor module 145.

The traveling unit 160 may be a component for moving the cleaning robot 100, and include wheel driving motors 161, traveling wheels 163, and a caster wheel 165 as illustrated in FIGS. 12 to 14.

The traveling wheels 163 may be provided at both ends of the bottom surface of the main body 101, and include a left traveling wheel 163a provided in the left side of the cleaning robot 100 with respect to the front of the cleaning robot 100 and a right traveling wheel 163b provided in the right side of the cleaning robot 100.

The traveling wheels 163 may receive a rotational force from the wheel driving motor 161 and move the cleaning robot 100. The wheel driving motor 161 may generate a rotational force for rotating the traveling wheels 163, and include a left driving motor 161a for rotating the left traveling wheel 163a and a right driving motor 161b for rotating the right traveling wheel 163b.

The left driving motor 161a and the right driving motor 161b may be independently operated by receiving a driving control signal from the robot control unit 110, respectively.

Since the left driving motor 161a and the right driving motor 161b are independently operated, the left traveling wheel 163a and the right traveling wheel 163b may be rotated independently from each other, and therefore the cleaning robot 100 may perform a variety of traveling such as forward traveling, rearward traveling, rotational traveling, rotating in place, and the like.

For example, when the left and right traveling wheels 163a and 163b are all rotated in a first direction, the cleaning robot 100 may linearly travel forward (move forward), and when the left and right traveling wheels 163a and 163b are all rotated in a second direction, the main body 101 may linearly travel backward (move backward).

In addition, when the left and right traveling wheels 163a and 163b are rotated at different speeds while they are rotated in the same direction, the cleaning robot 100 may rotatably travel to the right or left side, and when the left and right traveling wheels 163a and 163b are rotated in different directions, the cleaning robot 100 may rotate clockwise or counterclockwise in place.

The caster wheel 165 may be provided on the bottom surface of the main body 101 and allow the cleaning robot 100 to travel while maintaining a stable pose.

The traveling unit 160 may further include a motor driving circuit (not illustrated) that supplies a driving current to the wheel driving motors 161 in accordance with a control signal of the robot control unit 110, a power transmission module (not illustrated) that transmits a rotational force of the wheel driving motor 161 to the traveling wheels 163, a rotation detection sensor (not illustrated) that detects the rotational displacement and the rotational speed of the wheel driving motors 161 or the traveling wheels 163, and the like, in addition to the above-described components.

The cleaning unit 170 may include a drum brush 173 that scatters dust on the floor of the cleaning area, a brush driving motor 171 that rotates the drum brush 173, a dust suction fan 177 that suctions the scattered dust, a dust suction motor 175 that rotates the dust suction fan 177, and a dust container 179 that stores the suctioned dust.

The drum brush 173 may be provided in a dust suction port 105 formed on the bottom surface of the sub body 103 as illustrated in FIG. 14, and scatters dust on the cleaning floor into the dust suction port 105 while rotating with respect to a rotating shaft provided horizontally with the cleaning floor of the sub body 103.

The brush driving motor 171 may be provided adjacent to the drum brush 173 and rotate the drum brush 173 in accordance with a cleaning control signal of the robot control unit 110.

Although not illustrated in the drawings, the cleaning unit 170 may further include a motor driving circuit (not illustrated) that supplies a driving current to the brush driving motor 171 in accordance with the control signal of the robot control unit 110, and a power transmission module (not illustrated) that transmits the rotational force of the brush driving motor 171 to the drum brush 173.

The dust suction fan 177 may be provided in the main body 101 as illustrated in FIGS. 12 and 13, and suction the dust scattered by the drum brush 173 into the dust container 179.

The dust suction motor 175 may be provided adjacent to the dust suction fan 177, and rotate the dust suction fan 177 in accordance with the control signal of the robot control unit 110.

Although not illustrated in the drawings, the cleaning unit 170 may further include a motor driving circuit (not illustrated) that supplies a driving current to the dust suction motor 175 in accordance with the control signal of the robot control unit 110, and a power transmission module (not illustrated) that transmits the rotational force of the dust suction motor 175 to the dust suction fan 177.

The dust container 179 may be provided in the main body 101 as illustrated in FIGS. 12 and 13, and store the dust suctioned by the dust suction fan 177.

The storage unit 180 may store a control program and control data for controlling the cleaning robot 100, map information of the cleaning space which is acquired while the cleaning robot 100 is traveling, and the like.

The storage unit 180 may act as an auxiliary storage device that assists a memory 115 included in the robot control unit 110 which will be described below, and may be constituted of a non-volatile storage medium whose stored data is not destroyed even though the power of the cleaning robot 100 is cut off. Such a storage unit 180 may include a semiconductor device drive 181 that stores data in a semiconductor device, a magnetic disk drive 183 that stores data in a magnetic disk, and the like.

The light reception unit 190 includes a plurality of infrared ray receivers 191 (191a, 191b, 191c, 191d, 191e, and 191f) that receive infrared ray emitted by the remote device 200 and an infrared ray demodulator 193 that acquires a control command of a user by demodulating the infrared rays received by the plurality of infrared ray receivers 191a to 191f.

The plurality of infrared ray receivers 191a to 191f may include a left-rear infrared ray receiver 191a provided in a left rear side, a left infrared ray receiver 191b provided in a left side, a left-front infrared ray receiver 191c provided in a left front side, a right front infrared ray receiver 191d provided in a right front side, a right infrared ray receiver 191e provided in a right side, and a right-rear infrared ray receiver 191f provided in a right rear side. The number and installation example of the plurality of infrared ray receivers are not limited to those illustrated in FIGS. 12 and 13.

The plurality of infrared ray receivers 191a to 191f may be provided along the outer periphery of the main body 101 of the cleaning robot 100 and receive infrared rays propagated from all sides, and the cleaning robot 100 may determine the position (the position of the light spot) indicated by the remote device 200 in accordance with the position of the infrared ray receiver that receives the infrared ray emitted by the remote device 200 among the plurality of infrared ray receivers 191a to 191f.

Figure 15:
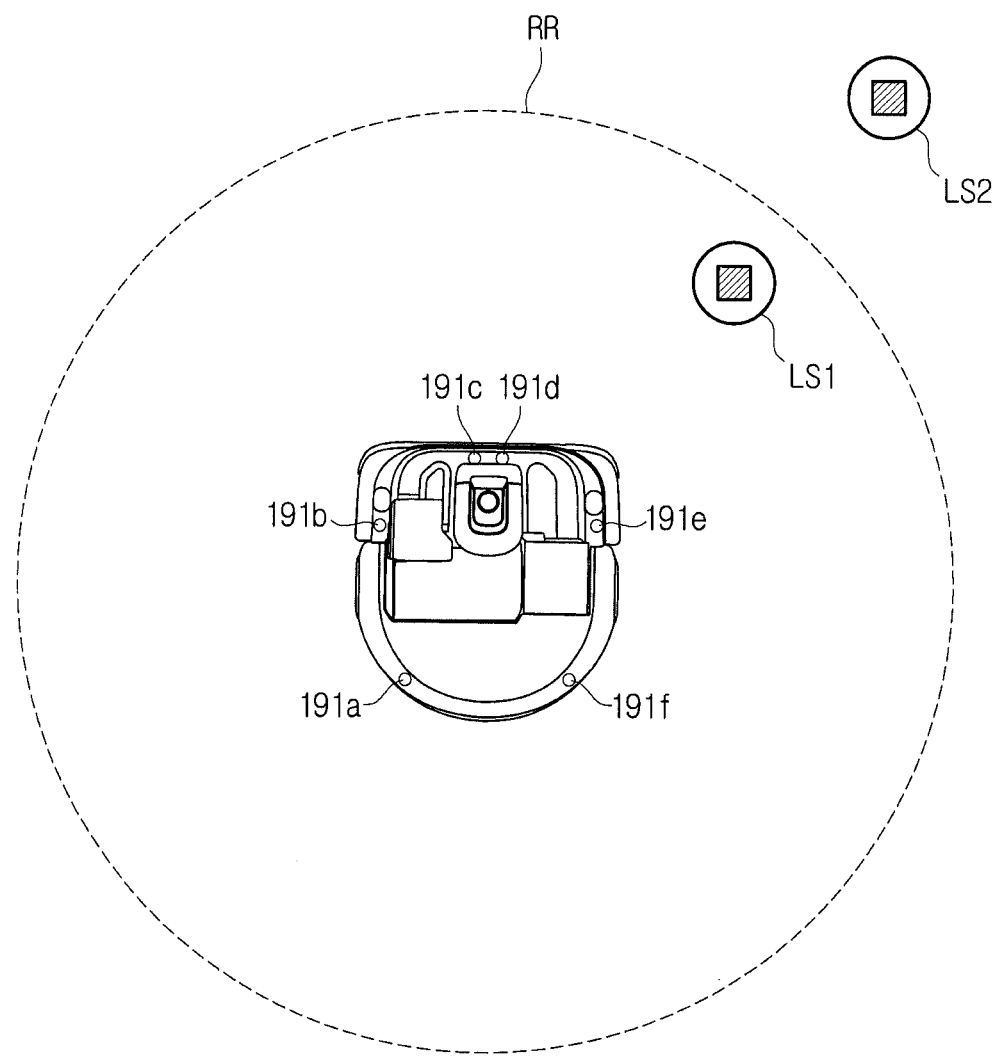
FIG. 15 is a diagram illustrating an example of an infrared detection area in which a cleaning robot can detect infrared rays emitted by a remote device in accordance with one embodiment of the present invention.
Figure 16:
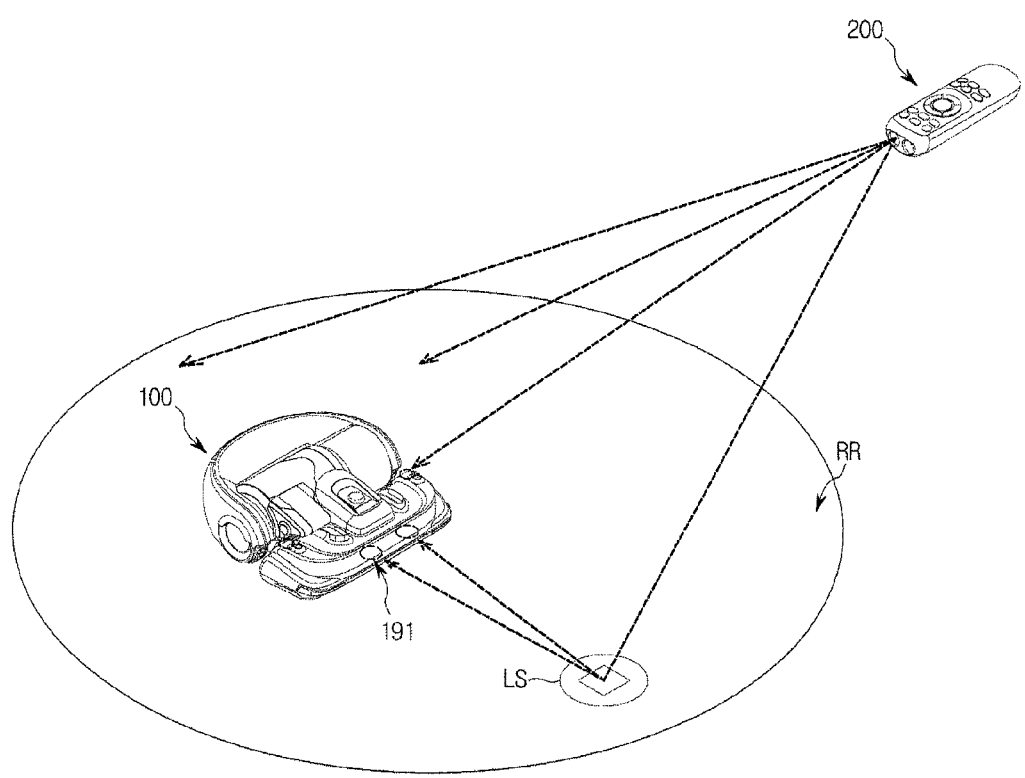
FIG. 16 is a diagram illustrating an example in which a plurality of infrared receivers of a cleaning robot receive light emitted from a remote device in accordance with one embodiment of the present invention.

FIG. 15 is a diagram illustrating an example of an infrared detection area in which a cleaning robot can detect infrared rays emitted by a remote device in accordance with one embodiment of the present invention, and FIG. 16 is a diagram illustrating an example in which a plurality of infrared receivers of a cleaning robot receive light emitted from a remote device in accordance with one embodiment of the present invention.

As described above, when a user moves the cleaning robot 100 using the remote device 200, the remove device 200 emits infrared rays toward the position to which the cleaning robot 100 is to move, and the cleaning robot 100 receives infrared rays reflected on the cleaning floor indicated by the remote device 200.

The reflected infrared ray has a shorter propagation distance than that of the infrared ray emitted directly from the remote device 200, and therefore the cleaning robot 100 may receive infrared rays reflected within an infrared ray reception range RR as illustrated in FIG. 15, and may not receive infrared rays reflected outside the infrared ray reception area RR.

Specifically, when the light spot LS is positioned within the infrared ray reception area RR, the cleaning robot 100 may receive a control command of a user and detect the position of the light spot LS. For example, as illustrated in FIG. 15, the cleaning robot 100 may detect a first light spot LS1 positioned within the infrared ray reception area RR, but may not detect a second light spot LS2 positioned outside the infrared ray reception area RR.

Meanwhile, according to an embodiment, a recognition distance between the cleaning robot 100 and the remote device 200 may be increased by widely designing the infrared ray reception range RR of the cleaning robot 100, and when the movement direction of the cleaning robot 100 is estimated, noise may occur due to blurring of light caused by the infrared rays emitted from the remote device 200 along with an increase in the recognition distance between the cleaning robot 100 and the remote device 200. Hereinafter, infrared ray that is made incident on the cleaning robot 100 may be referred to as noise regardless of the user's intention.

Referring to FIG. 16, the infrared ray output from the remote device 200 may be made into the infrared ray reception range RR of the cleaning robot 100, thereby forming the light spot LS within the infrared ray reception area RR, and the cleaning robot 100 may receive infrared ray reflected on the light spot LS. Meanwhile, some infrared rays among the infrared rays emitted from the remote device 200 may be made incident onto one or more infrared ray receivers among the plurality of infrared ray receivers 191a to 191f provided in the cleaning robot 100, so that noise may occur.

The cleaning robot 100 according to the disclosed invention may adopt a probability-based filtering method to minimize the noise that occurs due to the increase in the recognition distance between the cleaning robot 100 and the remote device 200, and the probability-based filtering method will be described later.

The infrared ray demodulator 193 demodulates the infrared ray received by the infrared ray receivers 191. The infrared ray modulator 295 of the remote device 200 may modulate the infrared rays in response to the control command of the user, and the infrared ray demodulator 193 of the cleaning robot 100 may demodulate the infrared rays modulated by the remote device 200 and acquire the control command of the user. In addition, the infrared ray demodulator 193 may provide the acquired control command to the robot control unit 110.

The robot control unit 110 controls the overall operations of the cleaning robot 100.

Specifically, the robot control unit 110 may include an input/output interface 117 that mediates outputting and inputting of data between various components included in the cleaning robot 100 and the robot control unit 110, the memory 115 that stores a program and data, a graphic processor 113 that performs image processing, a main processor 111 that performs an arithmetic operation in accordance with the program and data stored in the memory 113, and a system bus 119 that is a path of data transmission and reception among the input/output interface 117, the memory 115, the graphic processor 113, and the main processor 111.

The input/output interface 117 receives an image received from the image acquisition unit 130, an obstacle detection result detected by the obstacle detection unit 140, and the like, and transmits the received information to the main processor 111, the graphic processor 113, the memory 115, and the like via the system bus 119. In addition, the input/output interface 117 may transmit a variety of control signals output by the main processor 111 to the traveling unit 160 or the cleaning unit 170.

The memory 115 may read and store the control program and control data for controlling the operation of the cleaning robot 100 from the storage unit 180, or temporarily store the image acquired by the image acquisition unit 130, the obstacle detection result detected by the obstacle detection unit 140, and the like.

The memory 115 may include a volatile memory such as an SRAM, a DRAM, or the like. However, the example of the memory 115 is not limited thereto, and the memory 115 may include a non-volatile memory such as a flash memory, a ROM (read only memory), an EPROM, an EEPROM, or the like, as necessary.

The graphic processor 113 may convert the image acquired by the image acquisition unit 130 into a format that can be stored in the memory 115 or the storage unit 180, or change the resolution or size of the image acquired by the image acquisition unit 130.

In addition, the graphic processor 113 may convert a reflected light image acquired by the obstacle detection unit 150 into a format that can be processed by the main processor 111.

The main processor 111 may perform an arithmetic operation of estimating a direction indicated by the remote device 200 in accordance with the program and data stored in the memory 115.

As described above, some infrared rays among the infrared rays output from the remote device 200 in order to transmit the control command to the cleaning robot 100 may be made incident onto one or more infrared ray receivers among the plurality of infrared ray receivers 191a to 191f provided in the cleaning robot 100, so that noise may occur.

According to the present embodiment, the cleaning robot 100 may adopt a probability-based filtering method, so that it is possible to remove the noise transmitted to the cleaning robot 100 due to the increase in the recognition distance between the cleaning robot 100 and the remote device 200.

Hereinafter, the probability-based filtering method may refer to a method of estimating a traveling direction of the cleaning robot 100 based on Bayes theorem. The Bayes theorem is a method that calculates a posterior probability using a prior probability and likelihood, and the cleaning robot 100 according to the present embodiment may estimate the traveling direction of the cleaning robot 100 by filtering light in accordance with the probability-based filtering method using a Bayes filter.

The Bayes filter may include a Gaussian filter and a nonparametric filter. More specifically, the Gaussian filter may be a method of representing a probability distribution by an average of Gaussian and a dispersion parameter, and may be a concept including a Kalman filter, an EKF (extended Kalman filter), a UKF (unscented Kalman filter), an information filter, and the like. In addition, the nonparametric filter may be a method of representing a probability distribution by a finite sample, and may be a concept including a histogram filter and a particle filter. Hereinafter, for convenience of description, the particle filter will be described, but the example of the method of estimating the traveling direction of the cleaning robot 100 according to the disclosed present invention is not limited to the particle filter.

The particle filtering method may be referred to as an SMC (sequential Monte Carlo) method as one of a simulation method based on trial and error. Here, the Monte Carlo method may be a method of probabilistically calculating a value of a function by collecting a large number of random input results. The Monte Carlo method may find out characteristics of the system by probabilistically calculating the value of the function.

The main processor 111 may extract a plurality of samples having predicted values for the position and direction angle of the cleaning robot 100 in accordance with the particle filtering method, and calculate an optimal pose of the cleaning robot 100 using a probability in which each sample is the actual position and direction angle of the cleaning robot 100. Here, the pose may include position information of a two-dimensional coordinate system on the plane of the cleaning robot 100 and direction angle information of the particle for the forward direction of the cleaning robot 100.

Hereinafter, the arithmetic operation of the main processor 111 for estimating the direction indicated by the remote device 200 will be described in more detail with reference to the accompanying drawings.

Figure 17:
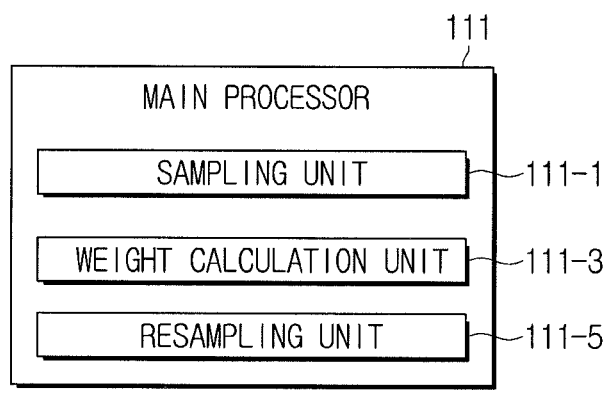
FIG. 17 is a control block diagram that functionally divides arithmetic operations of a main processor.

FIG. 17 is a control block diagram that functionally divides arithmetic operations of a main processor, and FIGS. 18 to 23 are diagrams illustrating a method of estimating a traveling direction of a cleaning robot by a particle filter method.

As illustrated in FIG. 17, the main processor 111 may include a sampling unit 111-1 for sampling particles, a weight calculation unit 111-3 for assigning a weight to the sampled particles, and a resampling unit 111-5 for reselecting particles based on the weight.

The main processor 111 may sample particles using the sampling unit 111-1, assign the weight to the sampled particles using the weight calculation unit 111-3, reselect particles based on the weight using the resampling unit 111-5, and then determine the traveling direction of the cleaning robot 100 based on a weight average value of arrangement angle information of the reselected particles.

Specifically, the sampling unit 111-1 may select a candidate position (hereinafter, may be referred to as "particle") of the cleaning robot 100 on an imaginary plane parallel to the plane of the cleaning area in which the cleaning robot 100 is positioned in accordance with pre-selected criteria.

The method of selecting the particle may be represented by the following Equation 1.

$$x\_t\hat{~}[m] \sim p(x\_t | u\_t, x\_t-1\hat{~}[m])$$ [Equation 1]

Here, m denotes a particle index, x_t denotes an arrangement angle of a particle P with respect to the front side of the cleaning robot 100, p denotes a probability distribution, u_t denotes a control input, x_t−1 denotes an arrangement angle of the particle P with respect to the front side of the cleaning robot 100 when a time is t−1.

Referring to Equation 1, particles selected in accordance with the probability distribution p may be differently determined. The sampling unit 111-1 according to an embodiment may sample particles in accordance with a Gaussian distribution having a fixed dispersion with respect to each of the particles P. When the particles are sampled in accordance with the Gaussian distribution, the particles P are highly likely to be selected as being values around an average value, and in this instance, the average value refers to an angle that is currently estimated by the particle P. Meanwhile, in Equation 1, p denotes the Gaussian distribution, and when there is no particular control input, u_t may be determined to be zero.

With reference to those described in FIGS. 18 and 19, the operation of the sampling unit will be described in more detail.

Figure 18:
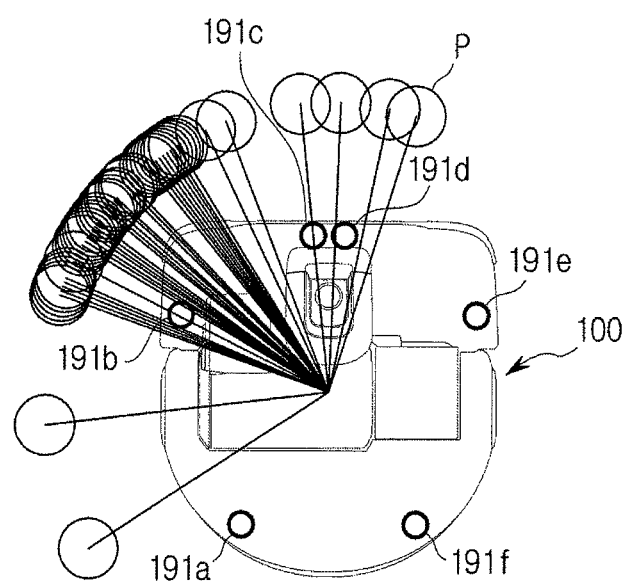
FIGS. 18 to 23 are diagrams illustrating a method of estimating a traveling direction of a cleaning robot by a particle filter method.
Figure 19:
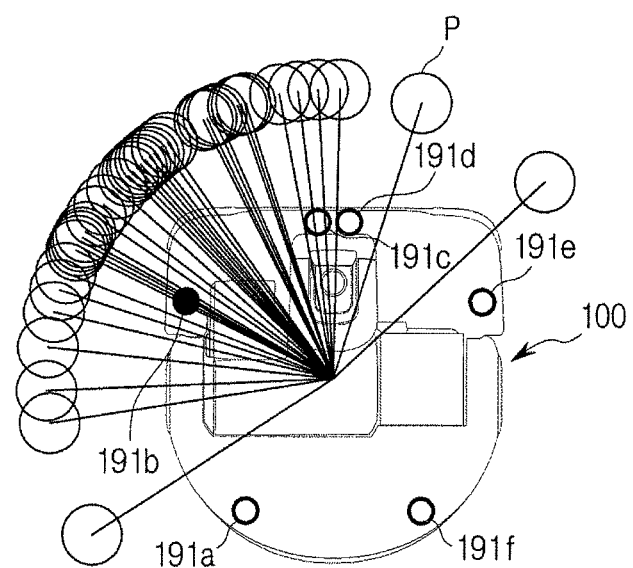

In the beginning of the sampling process, the particles P may be distributed as illustrated in FIG. 18. In the particle filtering method according to the present embodiment, the sampling process, the weight calculating process, and the resampling process may be repeated at a constant period, and therefore the distribution of the particles P as illustrated in FIG. 18 may be distribution of particles P which have been subjected to the resampling process and then determined. The sampling unit 111-1 may select the position of the particles P in accordance with the Gaussian distribution with respect to each of the particles P.

Figure 20:
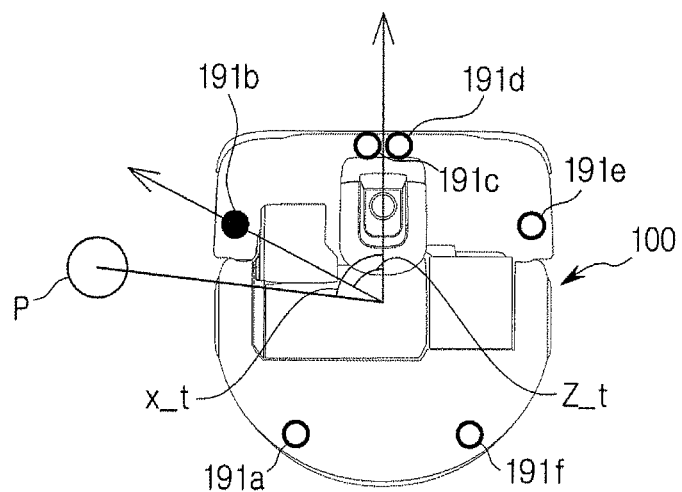

The weight calculation unit 111-3 may calculate the weight of each of the particles P selected in the sampling unit 111-1, and assign the weight to each of the particles P. More specifically, the weight calculation unit 111-3 may calculate the weight of each of the particles P based on the arrangement angle of the infrared ray receivers 191 with respect to the front side of the cleaning robot 100 and the arrangement angle information of the particles P with respect to the front side of the cleaning robot 100. The weight calculation unit 111-3 may calculate the weight of each of the particles P based on a difference between the arrangement angle of the infrared ray receivers 191 and the arrangement angle of the particles P. Referring to FIG. 20, the arrangement angle of the infrared ray receivers 191 with respect to the front side of the cleaning robot 100 may be defined as being z_t, and the arrangement angle of the particles P with respect to the front side of the cleaning robot 100 may be defined as being x_t.

The arrangement angle z_t of the infrared ray receivers 191 may be the arrangement angle of the infrared ray receivers 191 that receive infrared rays, and the infrared ray receivers 191 that receive infrared ray may be a single infrared ray receiver, but according to an embodiment, a plurality of infrared ray receivers 191 may receive infrared rays. Herein, the infrared ray receiver that receives an infrared signal among the plurality of infrared ray receivers 191*a* to 191*f* may be indicated by a dot filled with black color as illustrated in FIG. 19.

When the single infrared ray receiver 191*b* receives the infrared signal, the arrangement angle information of the corresponding infrared ray receiver 191*b* may be provided when the weight of each of the particles P is calculated.

When the plurality of infrared ray receivers 191*a* to 191*f* receive the infrared signal, the arrangement angle information of the plurality of infrared ray receivers 191*a* to 191*f* may be provided to the weight calculation unit 111-3, and the weight calculation unit 111-3 may calculate arrangement angle information of an imaginary infrared ray receiver based on the arrangement angle information of the plurality of infrared ray receivers 191*a* to 191*f*.

For example, when the infrared ray receiver 191*a* and the infrared ray receiver 191*b* simultaneously receive the infrared rays, the infrared ray receiver 191*a* may continuously receive the infrared signal and the infrared ray receiver 191*b* may discontinuously receive the infrared signal. In this case, the infrared ray receiver 191*b* may receive the infrared signal at a predetermined time interval, and whether the infrared signal is received may be displayed in the form of an optical signal.

When the infrared ray receiver 191*b* receives the infrared signal at an interval of a first time, the weight calculation unit 111-3 may determine that the infrared ray receiver is arranged at a distance of a first angle with respect to the front side of the cleaning robot 100. When the infrared ray receiver 191*b* receives the infrared signal at an interval of a second time, the weight calculation unit 111-3 may determine that the infrared ray receiver is arranged at a distance of a second angle with respect to the front side of the cleaning robot 100. Here, the second time may be longer than the first time, and in this case, the first angle may be smaller than the second angle.

The weight calculation unit 111-3 may calculate the weight of each of the particles P based on the arrangement angle z_t of the infrared ray receivers and the arrangement angle x_t of the particles P which are determined in the above-described method. More specifically, the weight calculation unit 111-3 may calculate a difference ΔA between the arrangement angle z_t of the infrared ray receivers and the arrangement angle x_t of the particles P, and determine the weight assigned to the particles P in such a manner that the difference ΔA and the weight assigned to each of the particles P are inversely proportional to each other.

For example, the weight calculation unit 111-3 may assign a relatively small weight to the corresponding particle P when the difference between the arrangement angle z_t of the infrared ray receivers and the arrangement angle x_t of the particles P is large, and assign a relatively large weight to the corresponding particle P when the difference between the arrangement angle z_t of the infrared ray receivers and the arrangement angle x_t of the particles P is small.

A method of calculating the weight may be represented by the following Equation 2.

$$w\_t^{[m]} = p(z\_t | x\_t^{[m]}) \quad \text{[Equation 2]}$$

Here, m denotes a particle index, x_t denotes an arrangement angle of the particles P with respect to the front side of the cleaning robot 100, p denotes a probability distribution, w_t denotes a weight of the estimated particle P, and z_t denotes an arrangement angle of the infrared ray receiver that receives an infrared signal with respect to the front side of the cleaning robot 100, and according to the present embodiment, p denotes a Gaussian distribution.

Figure 21:
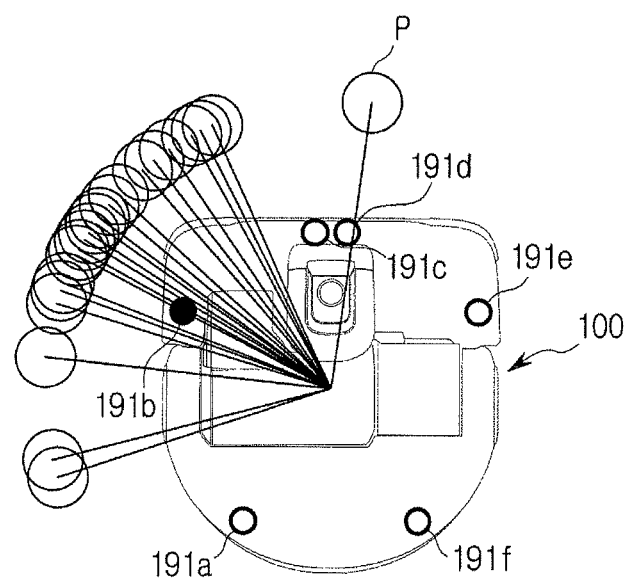

The resampling unit 111-5 may reselect the particles P based on the weight calculated by the weight calculation unit 111-3. Specifically, the resampling unit 111-5 may reselect the particles P when the weights of the particles P are biased (refers to a case in which an effective sample size becomes smaller). In other words, as illustrated in FIG. 21, the particles P having probabilistically small weights may disappear, and the particles P having probabilistically large weights may be copied.

Figure 22:
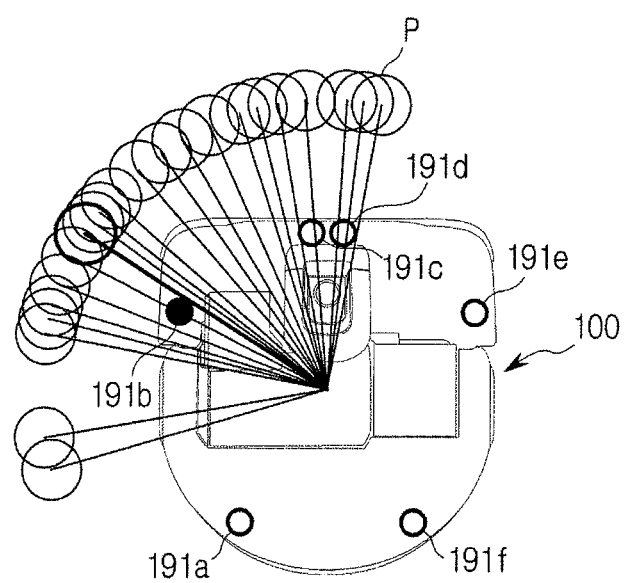

The main processor 111 may determine the traveling direction of the cleaning robot 100 by calculating a weight average value of the arrangement angles x_t of the particles P finally survived by the resampling unit 111-5. According to the present embodiment, the traveling direction of the cleaning robot 100 may be determined as illustrated in FIG. 22, and the determined traveling direction of the cleaning robot 100 may be a value that is probabilistically estimated based on the particle filtering method.

The cleaning robot 100 according to the disclosed invention may estimate the traveling direction in accordance with the above-described method, so that all directions around the cleaning robot 100 may be determined to be potentially a dragging direction. Accordingly, it is possible to more accurately estimate the traveling direction of the cleaning robot 100, and in other words, the resolution of the cleaning robot 100 may be improved.

In addition, it is possible to remove noise that may occur due to the increase in the recognition distance between the cleaning robot 100 and the remote device 200 by applying the probability-based filtering method. Thus, it is possible to accurately estimate the traveling direction of the cleaning robot 100 even in a noise environment.

Meanwhile, the main processor 111 may further include a particle initialization unit. However, according to an embodiment, the particle initialization unit may be omitted.

Figure 23:
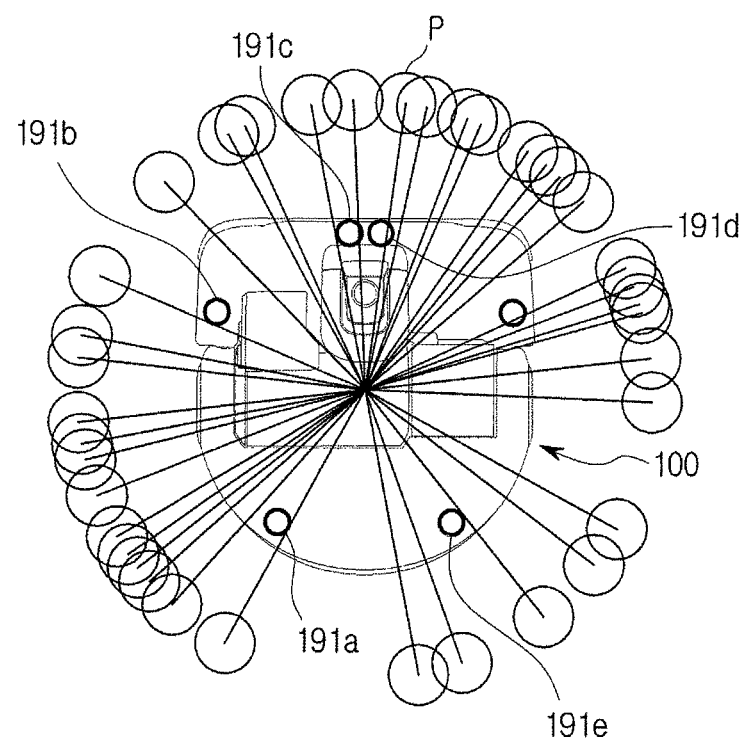

The particle initialization unit may initialize the particles P, as necessary. Specifically, the particle initialization unit may reselect the particles P in such a manner that the arrangement angle of each of the particles P has an arbitrary value within a range of 0 to 360 degrees as illustrated in FIG. 23. In this instance, the selected particles P may be selected to have the same weight.

The particle initialization unit may reselect the particles P when the traveling direction estimation of the cleaning robot 100 starts. According to an embodiment, when the distribution of the weights assigned to the particles P is excessively biased (in a case in which the effective sample size is significantly small), the particles P may be reselected. However, an example of initializing the particles P is not limited thereto.

The main processor 111 may process the detection result of the image acquisition unit 130 or the obstacle detection unit 140, or perform the arithmetic operation for controlling the traveling unit 160 and the cleaning unit 170.

For example, the main processor 111 may calculate the position of the cleaning robot 100 based on the image acquired by the image acquisition unit 130, or calculate the direction, the distance, and the size of the obstacle based on the image acquired by the obstacle detection unit 150.

In addition, the main processor 111 may perform an operation for determining whether to avoid the obstacle O or be in contact with the obstacle O depending on the direction, the distance, the size, and the like of the obstacle O. When it is determined to avoid the obstacle O, the main processor 111 may calculate a traveling path for avoiding the obstacle O, and when it is determined to be in contact with the obstacle O, the main processor 111 may calculate a traveling path for aligning the obstacle O and the cleaning robot 100.

In addition, the main processor 111 may generate traveling control data to be provided to the traveling unit 160 so that the cleaning robot 100 is moved along the calculated traveling path.

As described above, the configuration of the cleaning robot 100 has been described.

Hereinafter, the operation of the cleaning robot 100 will be described.

Figure 24:
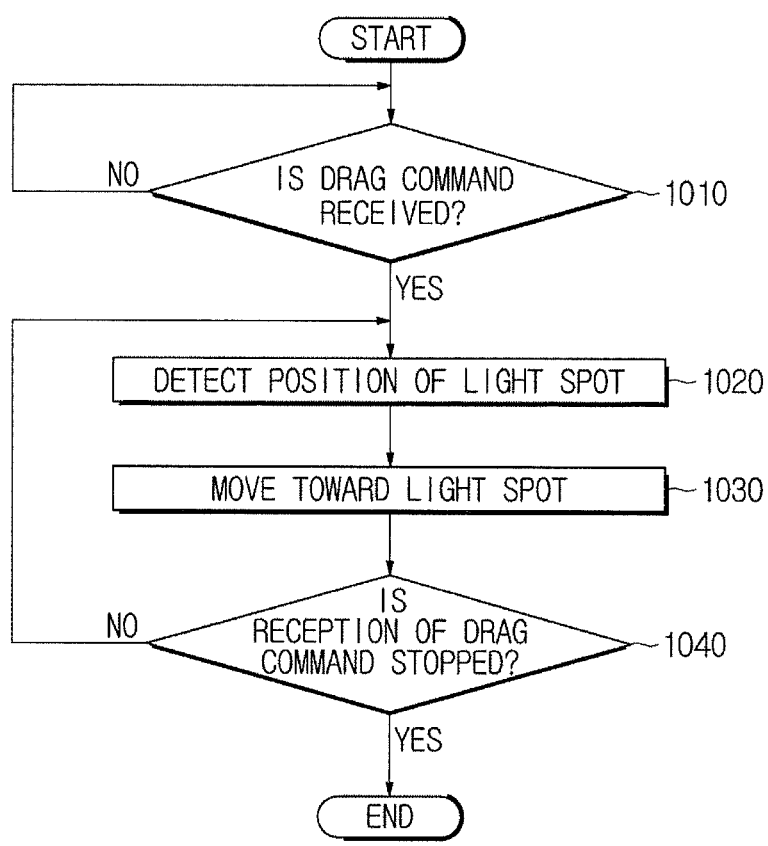
FIG. 24 is a flowchart illustrating an operating procedure of drag traveling of a cleaning robot in accordance with one embodiment of the present invention.
Figure 25:
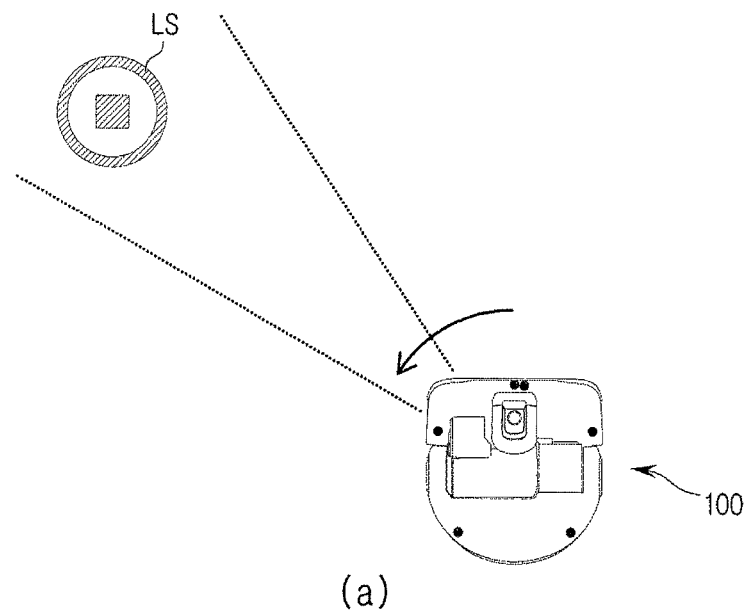
FIGS. 25 to 27 are diagrams illustrating an example in which a cleaning robot follows a light spot in accordance with one embodiment of the present invention.
Figure 25:
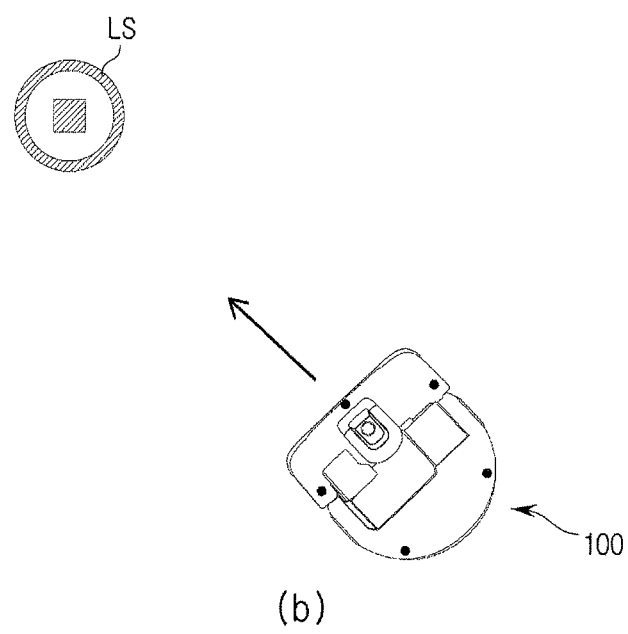
Figure 26:
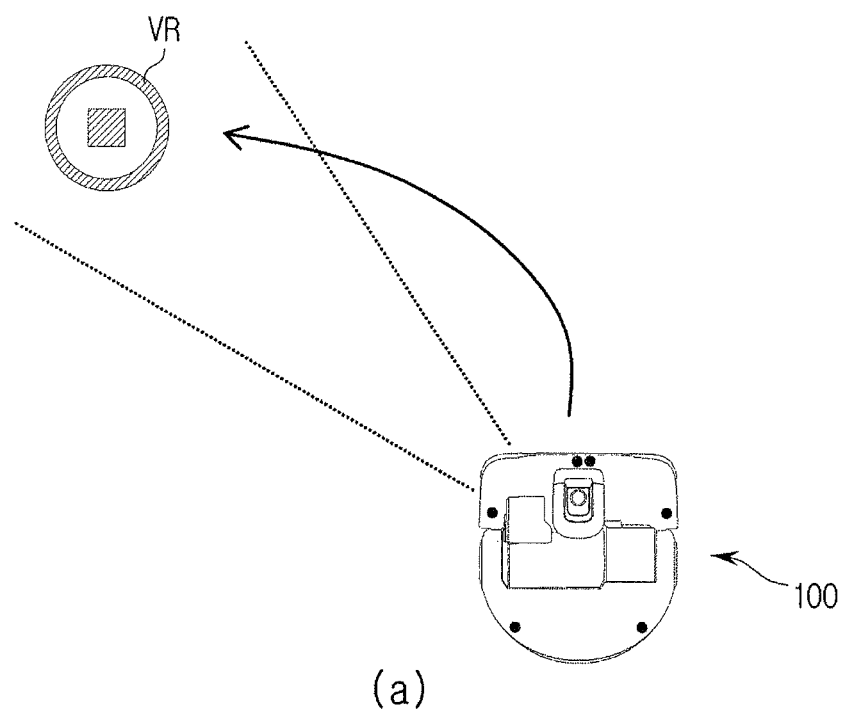
Figure 26:
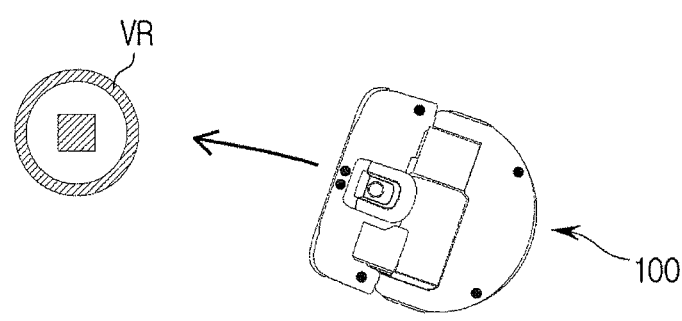
Figure 27:
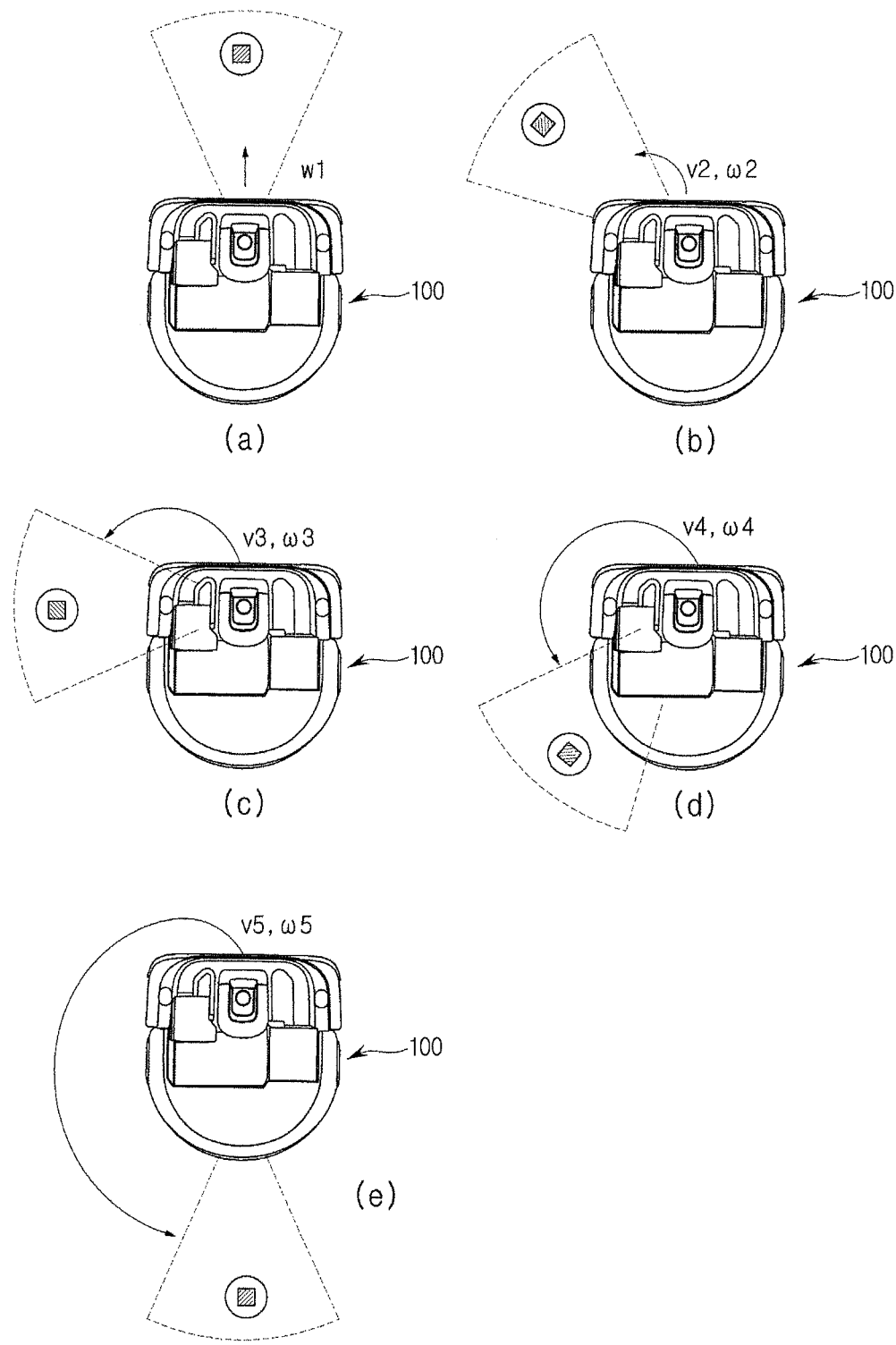

FIG. 24 is a flowchart illustrating an operating procedure of drag traveling of a cleaning robot in accordance with one embodiment of the present invention, and FIGS. 25 to 27 are diagrams illustrating an example in which a cleaning robot follows a light spot in accordance with one embodiment of the present invention.

Hereinafter, drag traveling of the cleaning robot 100 will be described with reference to FIGS. 24 to 27. Here, the drag traveling refers to traveling in which the cleaning robot 100 moves toward the position indicated by a user using the remote device 200, in other words, traveling of a point cleaning method.

First, in operation 1010, the cleaning robot 100 determines whether a drag command is received from the remote device 200.

The user may input the drag command to the cleaning robot 100 using the input unit 220 of the remote device 200.

When the user inputs the drag command to the remote device 200 while indicating the position (the floor of the cleaning area) to which the cleaning robot 100 is to move, the remote device 200 may modulate infrared rays in response to the drag command, and irradiate the position to which the cleaning robot 100 is to move with the modulated infrared rays together with visible light.

The visible light and infrared rays emitted by the remote device 200 in this manner may form a light spot LS in the position to which the cleaning robot 100 is to move, and be reflected by the floor of the cleaning area.

The cleaning robot 100 may receive the infrared rays reflected by the floor of the cleaning area through the light reception unit 190, and acquire the drag command by demodulating the received infrared rays.

When the drag command is not received (NO of operation 1010), the cleaning robot 100 may continue to perform an operation that has been previously performed.

In operation 1020, when the drag command is received (YES of operation 1010), the cleaning robot 100 may detect the position of the light spot LS based on the received infrared signal using the light reception unit 190.

When the remote device 200 irradiates the floor of the cleaning area with the infrared rays as described above, the cleaning robot 100 may receive the infrared rays reflected by the floor of the cleaning area using the light reception unit 190. More specifically, the cleaning robot 100 may receive the infrared rays reflected by the floor of the cleaning area through one or more infrared ray receivers among the plurality of infrared ray receivers 191a to 191f.

When the infrared rays are received through the infrared ray receiver 191, the main processor 111 of the cleaning robot control unit 110 may perform particle sampling. Next, the main processor 111 of the cleaning robot control unit 110 may estimate the position of the light spot LS, in other words, the dragging direction of the cleaning robot 100 by assigning a weight to the sampled particle P.

In operation 1030, when a relative position of the light spot LS is detected, the cleaning robot 100 moves toward the detected light spot LS.

The cleaning robot 100 may rotate in place so that the light spot LS may be positioned at front side of the cleaning robot 100, and then linearly move toward the light spot LS.

For example, when the light spot LS is positioned at the left front of the cleaning robot 100, the cleaning robot 100 may rotate counterclockwise toward the light spot LS as illustrated in (a) of FIG. 25. Next, the cleaning robot 100 may move forward toward the light spot as illustrated in (b) of FIG. 25.

According to an embodiment, the cleaning robot 100 may curvedly move toward the position of the light spot LS by varying the linear velocity and the angular velocity of the cleaning robot 100 depending on the position of the light spot LS.

For example, when the light spot LS is positioned at the left front side of the cleaning robot 100, the cleaning robot 100 may curvedly move toward the light spot LS while making a curved line as illustrated in (a) and (b) of FIG. 26.

Specifically, when the light spot LS is positioned at the front side of the cleaning robot 100 as illustrated in (a) of FIG. 27, the cleaning robot 100 may move at a first linear velocity v1 and a first angular velocity ω1, and in this instance, the first angular velocity ω1 may be "0". In other words, the cleaning robot 100 may move forward toward the light spot LS at the first linear velocity v1.

In addition, when the light spot LS is positioned at the left front side of the cleaning robot 100 as illustrated in (b) of FIG. 27, the cleaning robot 100 may move at a second linear velocity v2 and a second angular velocity ω2. In this instance, the second linear velocity v2 may be smaller than the above-described first linear velocity v1, and the second angular velocity ω2 may be determined to be a value other than "0". In other words, the cleaning robot 100 may perform rotational traveling having a second rotational radius r2 corresponding to the second linear velocity v2 and the second angular velocity ω2.

Although not illustrated in the drawings, when the light spot LS is positioned at the right front side of the cleaning robot 100, the cleaning robot 100 may move in the same manner as illustrated in (b) of FIG. 26, except that the direction of the cleaning robot 100 is changed.

In addition, when the light spot LS is positioned at the left side of the cleaning robot 100 as illustrated in (c) of FIG. 27, the cleaning robot 100 may move at a third linear velocity v3 and a third angular velocity ω3.

In this instance, the third linear velocity v3 may be smaller than the above-described second linear velocity v2, and the third angular velocity ω3 may be larger than the second angular velocity ω2. In other words, the cleaning robot 100 may perform rotational traveling having a third rotational radius r3 corresponding to the third linear velocity v3 and the third angular velocity ω3, and the third rotational radius r3 may be smaller than the second rotational radius r2.

Although not illustrated in the drawings, when the light spot LS is positioned at the right side of the cleaning robot 100, the cleaning robot 100 may move in the same manner as illustrated in (c) of FIG. 26, except that the direction of the cleaning robot 100 is changed.

In addition, when the light spot LS is positioned at the left rear of the cleaning robot 100 as illustrated in (d) of FIG. 27, the cleaning robot 100 may move at a fourth linear velocity v4 and a fourth angular velocity ω4.

In this instance, the fourth linear velocity v4 may be smaller than the above-described third linear velocity v3, and the fourth angular velocity ω4 may be larger than the third angular velocity ω3. In other words, the cleaning robot 100 may perform rotational traveling having a fourth rotational radius r4 corresponding to the fourth linear velocity v4 and the fourth angular velocity ω4, and the fourth rotational radius r4 may be smaller than the third rotational radius r3.

In this manner, by setting the fourth rotational radius r4 to be smaller than the third rotational radius r3, the cleaning robot 100 may more rapidly change the advancing direction as the light spot LS is positioned at the rear side of the cleaning robot 100.

Although not illustrated in the drawings, when the light spot LS is positioned at the right rear side of the cleaning robot 100, the cleaning robot 100 may move in the same manner as illustrated in (d) of FIG. 26, except that the direction of the cleaning robot 100 is changed.

In addition, when the light spot LS is positioned at the rear side of the cleaning robot 100 as illustrated in (e) of FIG. 27, the cleaning robot 100 may move at a fifth linear velocity v5 and a fifth angular velocity ω5. In this instance, the fifth linear velocity v5 and the fifth angular velocity ω5 may be identical to the above-described fourth linear velocity v4 and fourth angular velocity ω4. In other words, the cleaning robot 100 may perform rotational traveling having a fifth rotational radius r5 corresponding to the fifth linear velocity v5 and the fifth angular velocity ω5, and the fifth rotational radius r5 may be identical to the fourth rotational radius r4.

However, the present invention is not limited to a case in which the fifth linear velocity v5 and the fifth angular velocity ω5 are identical to the fourth linear velocity v4 and the fourth angular velocity ω4, and the fifth linear velocity v5 may be smaller than the above-described fourth linear velocity v4, and the fifth angular velocity ω5 may be larger than the fourth angular velocity ω4.

As described above, as the light spot LS is positioned at the rear side of the cleaning robot 100, the linear velocity of the cleaning robot 100 may be set to be smaller and the angular velocity thereof may be set to be larger. In this manner, as the light spot LS is positioned at the rear side of the cleaning robot 100, the linear velocity of the cleaning robot 100 may be set to be smaller and the angular velocity thereof may be se to be larger, so that it is possible to more rapidly change the advancing direction as the light spot LS is positioned at the rear side of the cleaning robot 100. Next, in operation 1040, the cleaning robot 100 determines whether the reception of the drag command is stopped. In other words, the cleaning robot 100 determines whether the reception of infrared rays including the drag command is stopped by the light reception unit 190.

The reception of the drag command may be stopped due to various reasons.

For example, when a user stops the drag command, the cleaning robot 100 may not receive the infrared rays including the drag command.

When the cleaning robot 100 reaches the position of the light spot LS, the user may stop the drag command. That is, the user may stop pressing the drag button 225 of the remote device 200.

In this manner, when the cleaning robot 100 reaches the designated position, the reception of the drag command may be stopped.

By way of another example, when the light spot LS is positioned outside a range in which the cleaning robot 100 can receive the infrared rays, the cleaning robot 100 may not receive the infrared rays including the drag command.

When the user rapidly moves the position indicated by the remote device 200, the light spot LS may be positioned outside the infrared ray reception range RR of the cleaning robot 100.

When the light spot LS is positioned outside the infrared ray reception range RR of the cleaning robot 100 in this manner, the cleaning robot 100 may not receive the infrared rays including the drag command, so that the reception of the drag command may be stopped.

When the cleaning robot 100 reaches the designated position or when the user indicates a position outside the infrared ray reception range RR of the cleaning robot 100, the cleaning robot 100 may not receive the infrared rays including the drag command.

When the reception of the drag command is continued (NO of operation 1040), the cleaning robot 100 may repeat the position detection of the light spot LS and the movement toward the light spot LS.

When the reception of the drag command is stopped (YES of operation 1040), the cleaning robot 100 may stop following the light spot LS.

In FIGS. 24 to 27, a case in which the infrared signal is input to the single infrared ray receiver 191b in a noise-free environment has been described, but the cleaning robot 100 may face more various environments.

According to an embodiment, the cleaning robot 100 may receive the infrared signal in a plurality of directions, and in this case, the infrared signal may be made incident onto the plurality of infrared ray receivers 191. When the infrared signal is made incident onto the plurality of infrared ray receivers 191, the process of estimating the position of the light spot LS may be performed in the same manner as that in FIGS. 24 to 27, and hereinafter, repeated description thereof will be omitted.

By way of another example, noise may be input to the infrared ray receivers 191 of the cleaning robot 100 while the cleaning robot 100 performs drag traveling. The cleaning robot 100 may detect the position of the light spot LS in the probability-based filtering method, and therefore the cleaning robot 100 may not immediately respond to the noise even in a case in which the noise is input to the plurality of infrared ray receivers 191a and 191b. Hereinafter, when noise is input to the cleaning robot 100 during the drag traveling of the cleaning robot 100, the drag traveling of the cleaning robot 100 will be described.

Figure 28:
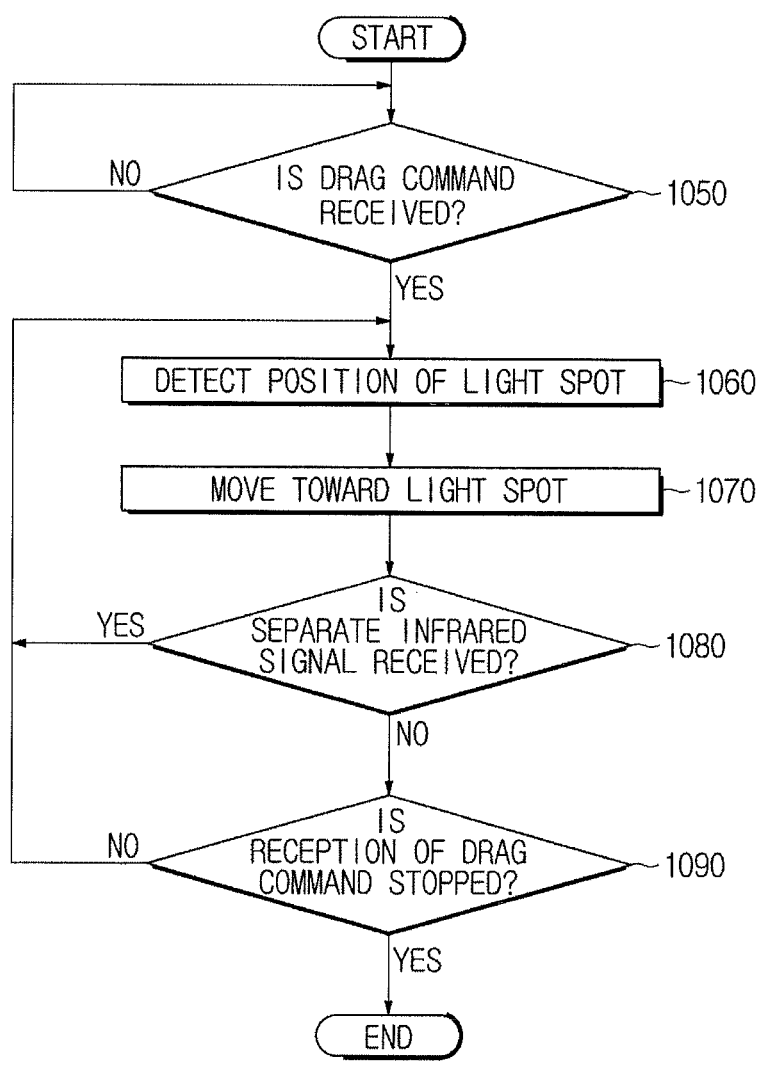
FIG. 28 is a diagram illustrating an operation method of a cleaning robot in accordance with one embodiment of the present invention.
Figure 29:
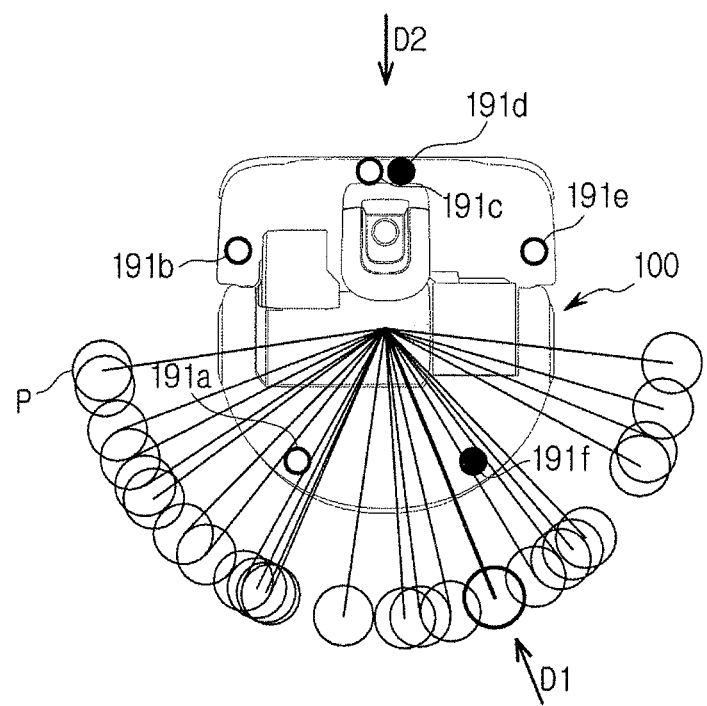
FIG. 29 is a diagram illustrating an example in which a cleaning robot estimates a traveling direction in a noise environment in accordance with one embodiment of the present invention.

FIG. 28 is a diagram illustrating an operation method of a cleaning robot in accordance with one embodiment of the present invention, and FIG. 29 is a diagram illustrating an example in which a cleaning robot estimates a traveling direction in a noise environment in accordance with one embodiment of the present invention.

With reference to FIGS. 28 and 29, the drag traveling of the cleaning robot 100 in a noise environment will be described.

First, in operation 1050, the cleaning robot 100 determines whether a drag command is received from the remote device 200.

When a user inputs the drag command to the remote device 200 while indicating the position (the floor of the cleaning area) to which the cleaning robot 100 is to move, the remote device 200 may modulate infrared rays in response to the drag command, and irradiate the position to which the cleaning robot 100 is to move with the modulated infrared rays together with visible light.

The cleaning robot 100 may receive infrared rays reflected by the floor of the cleaning area through the light reception unit 190, and acquire the drag command by demodulating the received infrared rays.

When the drag command is not received (NO of operation 1050), the cleaning robot 100 may continue to perform an operation that has been previously performed.

When the drag command is received (YES of operation 1050), the cleaning robot 100 may detect the position of the light spot LS based on the infrared signal which has been made incident through the infrared ray receiver 191 of the light reception unit 190 in operation 1160, and move toward the detected position of the light spot LS in operation 1170. The position detection of the light spot LS and the movement toward the light spot LS are the same as described above, and repeated description thereof will be omitted.

In operation 1080, the cleaning robot 100 determines whether a separate infrared signal is received while the cleaning robot 100 is moving toward the light spot LS. Here, the separate infrared signal may be a drag command which is newly generated by the user using the remote device 200, or a drag command which is made incident onto the infrared ray receivers 191, regardless of the user's intention.

When the separate infrared signal is received (YES of operation 1080), the cleaning robot 100 may repeat the position detection of the light spot LS and the movement toward the light spot LS.

In this instance, according to an embodiment, the separate infrared signal may be an infrared signal which is made incident in the opposite direction to a direction in which the infrared signal emitted from the remote device 200 is made incident. In other words, the separate infrared signal may be noise which has been made incident onto the infrared ray receiver 191 of the cleaning robot 100, regardless of the user's intention during the traveling of the cleaning robot 100.

The cleaning robot 100 according to the present embodiment may calculate an estimated value of the currently received infrared signal based on an estimated value of the past particle filter, and therefore, although the infrared signal is received in the opposite direction D2 to a direction D1 in which the initial infrared signal is received as illustrated in FIG. 29, the distribution of the particles does not reach the corresponding infrared signal. Consequently, the infrared signal temporarily received in the opposite direction D2 may be ignored when the drag direction of the cleaning robot 100 is determined.

According to an embodiment, when the separate infrared signal is continuously received (YES of operation 1080), the particles may turn to follow the direction of the corresponding infrared signal after the filtering process several times. In this case, it can be interpreted that the separate infrared signal is not noise.

The cleaning robot 100 may minimize the noise that occurs due to the increase in the recognition distance between the cleaning robot 100 and the remote device 200 by filtering the noise in the above-described method.

In operation 1190, when the separate infrared signal is not received (NO of operation 1080), the cleaning robot 100 determines that the reception of the drag command is stopped.

When the reception of the drag command is continued (NO of operation 1090), the cleaning robot 100 repeats position detection of the light spot LS, movement toward the light spot LS, and determination whether the separate infrared signal is received.

As described above, when the reception of the drag command is stopped (YES of operation 1090), the cleaning robot 100 stops following of the light spot LS. When the cleaning robot 100 reaches the designated position or when a user indicates the position outside the infrared ray reception range of the cleaning robot 100, the reception of the drag command may be stopped.

As described above, the drag traveling of the cleaning robot 100 in the noise environment has been described.

According to an embodiment, when the obstacle O is detected on the movement path of the cleaning robot 100 during the drag traveling of the cleaning robot 100, the cleaning robot 100 may perform collision avoidance traveling of avoiding a collision with the obstacle O. Hereinafter, the collision avoidance traveling in which the cleaning robot 100 avoids a collision with the obstacle O during the drag traveling of the cleaning robot 100 will be described.

Figure 30:
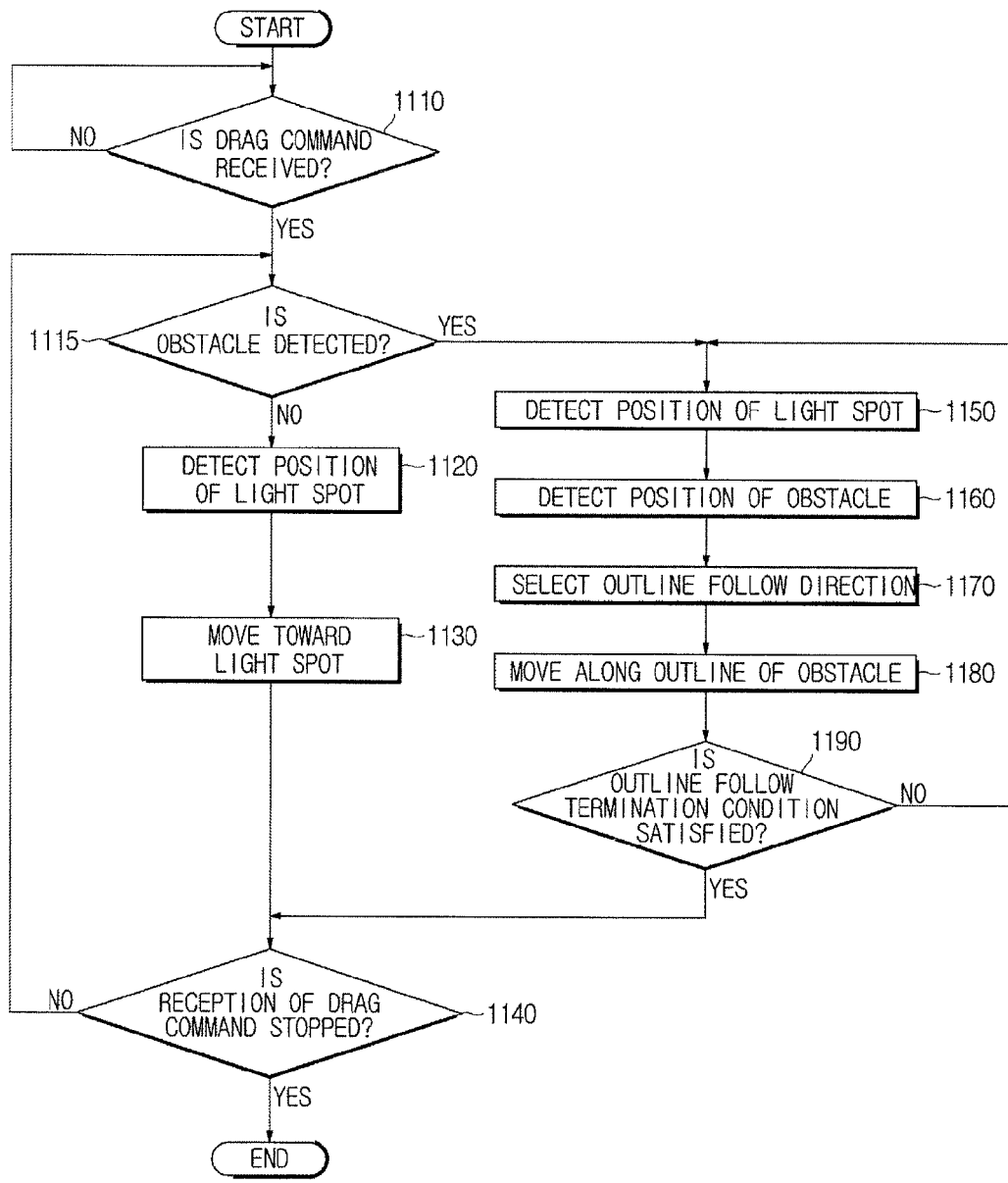
FIG. 30 is a diagram illustrating an operation method of collision avoidance traveling of a cleaning robot in accordance with one embodiment of the present invention.
Figure 31:
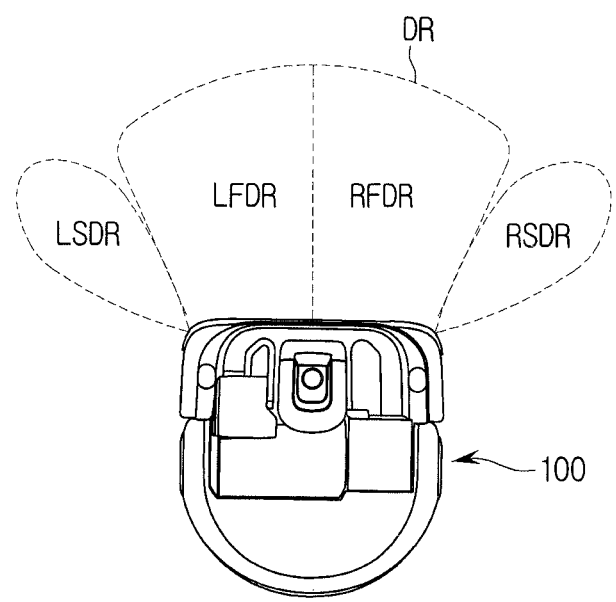
FIG. 31 is a diagram illustrating an example in which a cleaning robot detects a position of an obstacle in accordance with one embodiment of the present invention.
Figure 32:
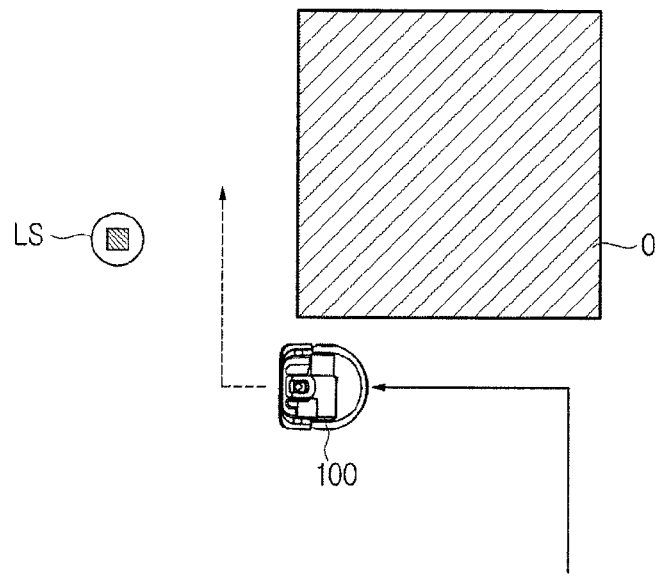
FIG. 32 is a diagram illustrating an example in which a cleaning robot follows an outline of an obstacle in accordance with one embodiment of the present invention.
Figure 32:
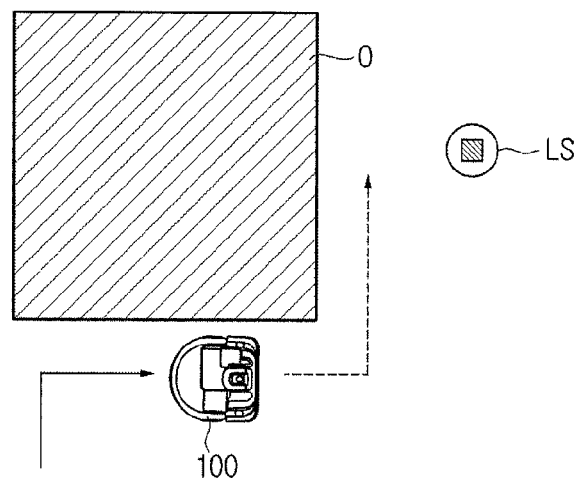

FIG. 30 is a diagram illustrating an operation method of collision avoidance traveling of a cleaning robot in accordance with one embodiment of the present invention, FIG. 31 is a diagram illustrating an example in which a cleaning robot detects a position of an obstacle in accordance with one embodiment of the present invention, and FIG. 32 is a diagram illustrating an example in which a cleaning robot follows an outline of an obstacle in accordance with one embodiment of the present invention.

With reference to FIGS. 30 to 32, the collision avoidance traveling of the cleaning robot 100 will be described. However, description of the same operations as those described in FIGS. 24 to 27 will be simplified.

First, in operation 1110, the cleaning robot 100 determines whether a drag command is received from the remote device 200.

When a user inputs the drag command to the remote device 200 while indicating a position (the floor of the cleaning area) to which the cleaning robot 100 is to move, the remote device 200 may modulate infrared rays in response to the drag command, and irradiate the position to which the cleaning robot 100 is to move with the modulated infrared rays together with visible light.

The cleaning robot 100 may receive infrared rays reflected by the floor of the cleaning area using the light reception unit 190, and acquire the drag command by demodulating the received infrared rays.

When the drag command is not received (NO of operation 1110), the cleaning robot 100 may continue to perform an operation which has been previously performed.

In operation 1115, when the drag command is received (YES of operation 1110), the cleaning robot 100 determines whether the obstacle O is detected.

The cleaning robot 100 may detect the obstacle O preventing the traveling of the cleaning robot 100 using the above-described obstacle detection unit 140.

The cleaning robot 100 may detect the obstacle O positioned in front of the cleaning robot 100 using the light emission module 141 and the light reception module 143.

The light emission module 141 emits planar light toward the front of the cleaning robot 100, and the light reception module 143 receives reflected light reflected by the obstacle O. Such reflected light may be reflected by several parts of the obstacle O, and therefore the light reception module 143 may receive a two-dimensional reflected light image. In addition, the cleaning robot 100 may calculate the position, the size, and the like of the obstacle O based on the reflected light image received by the light reception module 143.

In addition, the cleaning robot 100 may detect the obstacle O positioned at the side surface of the cleaning robot 100 using the light sensor module 145.

The light sensor module 145 may emit light toward the side surface of the cleaning robot 100, and receive the light reflected by the obstacle O. In addition, the cleaning robot 100 may calculate a distance between the cleaning robot 100 and the obstacle O by analyzing the received light.

When the obstacle O is not detected (NO of operation 1115), the cleaning robot 100 detects the position of the light spot LS based on an infrared signal made incident through the infrared ray receivers 191 of the light reception unit 190 in operation 1120, and moves toward the detected light spot LS in operation 1130. The position detection of the light spot LS and the movement toward the light spot LS are the same as those described above, and repeated description thereof will be omitted.

In addition, in operation 1140, the cleaning robot 100 determines whether the reception of the drag command is stopped.

When the reception of the drag command is continued (NO of operation 1040), the cleaning robot 100 repeats detection of the obstacle O, position detection of the light spot LS, and movement toward the light spot LS.

When the reception of the drag command is stopped (YES of operation 1040), the cleaning robot 100 stops following of the light spot LS. When the cleaning robot 100 reaches the designated position or when a user indicates a position outside the infrared ray reception range of the cleaning robot 100, the reception of the drag command may be stopped, as described above.

According to an embodiment, when the obstacle O is detected (YES of operation 1115), the cleaning robot 100 detects the position of the light spot LS in operation 1150. A method in which the cleaning robot 100 detects the position of the light spot LS is the same as that described above, and repeated description thereof will be omitted.

Next, in operation 1160, the cleaning robot 100 detects the position of the obstacle O.

The cleaning robot 100 may detect the position of the obstacle O using the obstacle detection unit 140. For example, as illustrated in FIG. 31, the cleaning robot 100 may partition an obstacle detection range DR in which the obstacle detection unit 140 can detect the obstacle O into a plurality of regions, and determine in which region the obstacle O is positioned.

The obstacle detection range DR may be partitioned into a left side detection range LSDR positioned at the left side of the cleaning robot 100, a left front detection range LFDR positioned at the left front side of the cleaning robot 100, a right front detection range RFDR positioned at the right front side of the cleaning robot 100, and a right side detection region RSDR positioned at the right side of the cleaning robot 100.

When the obstacle O is detected by a left light sensor module 145a included in the obstacle detection unit 140, the cleaning robot 100 may determine that the obstacle O is positioned in the left side detection range LSDR, and when the obstacle O is detected by a right light sensor module 145b, the cleaning robot 100 may determine that the obstacle O is positioned in the right side detection range RSDR. In addition, the cleaning robot 100 may detect whether the obstacle O is positioned in the left front detection range LFDR or the right front detection range RFDR based on the reflected light image received by the light reception module 143.

As described above, the obstacle detection range DR may be partitioned into four detection regions, but is not limited thereto. For example, the obstacle detection region range DR may be partitioned into three detection regions or less or five detection regions or more.

In operation 1170, after detecting the position of the light spot LS and the position of the obstacle O, the cleaning robot 100 selects a direction of outline follow traveling for avoiding a collision with the obstacle O.

When the obstacle O is detected, the cleaning robot 100 may perform outline follow traveling in which the cleaning robot 100 moves parallel to the outline of the obstacle O in order to avoid the collision with the obstacle O and move toward the light spot LS.

The outline follow traveling may include right follow traveling RWF in which the cleaning robot 100 travels while the right surface of the cleaning robot 100 maintains a constant distance with the obstacle O as illustrated in (a) of FIG. 32, and left follow traveling LWF in which the cleaning robot 100 travels while the left surface of the cleaning robot 100 maintains a constant distance with the obstacle O as illustrated in (b) of FIG. 32.

When the obstacle O is detected during the drag traveling, the cleaning robot 100 may select any one of the right follow traveling RWF and the left follow traveling LWF based on the position of the light spot LS and the position of the obstacle O in order to travel up to the position of the light spot LS in the shortest path.

In operation 1180, when a direction of following the outline of the obstacle O is selected, the cleaning robot 100 travels in parallel to the outline of the obstacle O along the selected direction.

The robot control unit 110 of the cleaning robot 100 may control the traveling unit 160 so that the cleaning robot 100 travels while the left surface of the right surface of the cleaning robot 100 maintains a constant distance with the outline of the obstacle O.

Next, in operation 1190, the cleaning robot 100 determines whether an outline follow termination condition of the obstacle O is satisfied.

When the light spot LS is positioned in the opposite side of the obstacle O or when the light spot LS is positioned in the opposite direction to the traveling direction of the cleaning robot 100, the cleaning robot 100 may stop outline follow traveling and perform drag traveling of following the light spot LS.

When the outline follow termination condition is not satisfied (NO of operation 1190), the cleaning robot 100 repeats position detection of the light spot LS, position detection of the obstacle O, and outline follow traveling of the obstacle O.

In operation 1140, when the outline follow termination condition is satisfied (YES of operation 1190), the cleaning robot 100 determines whether the reception of the drag command is stopped.

When the reception of the drag command is continued (NO of operation 1040), the cleaning robot 100 repeats detection of the obstacle O, position detection of the light spot LS, and movement toward the light spot LS, and when the reception of the drag command is stopped (YES of operation 1040), the cleaning robot 100 stops follow toward the light spot LS and outline follow of the obstacle O.

As described above, according to the moving robot and the method for controlling the moving robot according to an embodiment of the present invention, it is possible to provide a more intuitive operation method compared to when the moving robot is manually operated.

In addition, obstacle avoidance may be automatically performed in an environment in which an obstacle is present, so that it is possible to provide operation convenience to a user.

In addition, even when the intensity of the emission light transmitted from the remote device is large, the moving robot may move forward in a direction indicated by the user.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A robot comprising:
a traveling unit to propel the robot;
a light reception unit to receive light from a light spot; and
a control unit comprising at least one processor configured to
determine a position of the light spot by filtering the light received by the light reception unit in accordance with a probability-based filtering method,
determine a traveling direction of the robot based on the determined position of the light spot, the travelling direction being a direction toward the light spot or a direction to travel around an obstacle to reach the light spot, and
in response to determining the traveling direction, control the traveling unit to propel the robot in the determined traveling direction.

2. The robot according to claim 1, wherein, to determine the traveling direction, the at least one processor of the control unit is configured to:
sample particles, the particles representing directions outward from the robot at respective arrangement angles with respect to a front side of the robot,
assign a weight to each of the sampled particles,
reselect the particles based on the weight, and
determine the traveling direction of the robot based on information indicating the arrangement angles represented by the reselected particles.

3. The robot according to claim 2, wherein the at least one processor of the control unit is configured to determine the traveling direction of the robot based on a weight average value of the information indicating the arrangement angles represented by the reselected particles.

4. The robot according to claim 3, wherein the at least one processor of the control unit is configured to sample the particles in accordance with a Gaussian distribution of the sampled particles.

5. The robot according to claim 3, wherein the at least one processor of the control unit is configured to assign the weight to each of the sampled particles based on a difference between an arrangement angle of the light reception unit with respect to the front side of the robot and the respective arrangement angle represented by the sampled particle.

6. The robot according to claim 5, wherein the at least one processor of the control unit is configured to assign the weight to each of the sampled particles such that the weight assigned to each of the sampled particles is inversely proportional to the difference between the arrangement angle of the light reception unit and the respective arrangement angle represented by the sampled particle.

7. The robot according to claim 5, wherein
the light reception unit is among a plurality of light reception units included in the robot, each of the plurality of light reception units being at a respective arrangement angle with respect to the front of the robot, and
at least one processor of the control unit is configured to determine, when the plurality of light reception units receive an optical signal, an arrangement angle of an imaginary light reception unit based on information indicating the arrangement angles of the plurality of light reception units.

8. The robot according to claim 3, wherein the at least one processor of the control unit is configured to resample by reselecting, from the sampled particles, a subset of the sampled particles having the assigned weight of a probabilistically preset reference or more as the reselected particles.

9. The robot according to claim 1, wherein
the received light is a first light signal, and
the at least one processor of the control unit is configured to, when the light reception unit receives the first light signal and a second light signal separate from the first light signal, determine the position of the light spot by filtering the first and second light signals received by the light reception unit in accordance with the probability-based filtering method.

10. The robot according to claim 2, wherein the at least one processor of the control unit is configured to initialize the particles by setting the particles to have a same weight.

11. The robot according to claim 1, wherein the at least one processor of the control unit is configured to determine the position of the light spot by filtering the light received by the light reception unit in accordance with the probability-based filtering method using a Bayes filter.

12. The robot according to claim 11, wherein the Bayes filter includes at least one of a Kalman filter, an EKF (extended Kalman filter), a UKF (unscented Kalman filter), an information filter, a histogram filter, and a particle filter.

13. The robot according to claim 1, further comprising:
an obstacle detection unit to detect a position of an obstacle,
wherein when the position of the obstacle is detected to be between the robot and the position of the light spot, the control unit controls the traveling unit so that the robot follows an outline around the obstacle in accordance with the position of the obstacle and the determined traveling direction.

14. The robot according to claim 13, wherein the control unit controls the traveling unit to perform any one of:
right follow traveling, in which the robot travels to allow a right side of the robot to face the obstacle, and
left follow traveling, in which the robot travels to allow a left side of the robot to face the obstacle.

15. A method for controlling a robot, comprising:
receiving light from a light spot by a light reception unit of the robot;
determining a position of the light spot by filtering the received light in accordance with a probability-based filtering method;
determining a traveling direction of the robot based on the determined position of the light spot, the travelling direction being a direction toward the light spot or a direction to travel around an obstacle to reach the light spot; and
in response to determining the traveling direction, controlling the robot to travel along the determined traveling direction.

16. The method for controlling the robot according to claim 15, wherein the determining of the traveling direction includes:
sampling particles, the particles representing directions outward from the robot at respective arrangement angles with respect to a front side of the robot,
assigning a weight to each of the sampled particles,
reselecting particles based on the weight, and determining the traveling direction of the robot based on a weight average value of information indicating the arrangement angles represented by the reselected particles.

17. The method for controlling the robot according to claim 16, wherein the sampling of the particles includes sampling the particles in accordance with Gaussian distribution of the sampled particles.

18. The method for controlling the robot according to claim 16, wherein the assigning of the weight to each of the sampled particles includes assigning the weight to each of the particles based on a difference between an arrangement angle of the light reception unit with respect to the front side of the robot and the respective arrangement angle represented by the particle.

19. The method for controlling the robot according to claim 18, wherein the assigning of the weight to each of the sampled particles includes assigning the weight to each of the particles so that the weight assigned to each of the particles is inversely proportional to the difference between the arrangement angle of the light reception unit and the respective arrangement angle represented by the sampled particle.

20. The method for controlling the robot according to claim 18, wherein
   the light reception unit is among a plurality of light reception units, each of the plurality of light reception units being at a respective arrangement angle with respect to the front of the robot, and
   the method further comprises:
       receiving an optical signal using a plurality of light reception units, and
       determining an arrangement angle of an imaginary light reception unit based on information indicating arrangement angles of the plurality of light reception units.

21. The method for controlling the robot according to claim 16, wherein the reselecting of the particles based on the weight includes reselecting, from the sampled particles, a subset of the sampled particles having the assigned weight of a probabilistically preset reference or more.

22. The method for controlling the robot according to claim 15, wherein
   the received light is a first light signal,
   the method further comprises receiving a second light signal separate from the first light signal by the light reception unit, and
   the determining the position of the light spot is performed by filtering the first and second light signals received by the light reception unit in accordance with the probability-based filtering method.

23. The method for controlling the robot according to claim 15, wherein the determining of the traveling direction includes reselecting a plurality of particles to have the same weight.

24. The method for controlling the robot according to claim 15, wherein the determining of the traveling direction includes determining the position of the light spot by filtering the received light in accordance with the probability-based filtering method using a Bayes filter.

25. The method for controlling the robot according to claim 15, wherein the determining of the traveling direction includes determining the traveling direction by filtering the received light in accordance with the probability-based filtering method including at least one of Kalman filter, an EKF, a UKF, an information filter, a histogram filter, and a particle filter.

26. The method for controlling the robot according to claim 15, wherein the performing of the traveling along the determined traveling direction includes:
   detecting a position of an obstacle during the traveling, and
   in response to detecting that the position of the obstacle is between the robot and the position of the light spot, performing traveling so that the robot follows an outline around the obstacle in accordance with the position of the obstacle and the determined traveling direction.

27. The method for controlling the robot according to claim 26, wherein the performing of the traveling along the determined traveling direction includes performing any one of:
   traveling in which the robot travels to allow a right side of the robot to face the obstacle, and
   traveling in which the robot travels to allow a left side of the robot to face the obstacle.

* * * * *